United States Patent
Iwai et al.

(10) Patent No.: US 10,454,720 B2
(45) Date of Patent: *Oct. 22, 2019

(54) TERMINAL DEVICE, WIRELESS TRANSMISSION METHOD, BASE STATION DEVICE, AND CHANNEL ESTIMATION METHOD

(71) Applicant: Panasonic Intellectual Property Corporation of America, Torrance, CA (US)

(72) Inventors: Takashi Iwai, Ishikawa (JP); Daichi Imamura, Dalian (CN); Akihiko Nishio, Osaka (JP); Yoshihiko Ogawa, Kanagawa (JP); Kazuki Takeda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,105

(22) Filed: Oct. 3, 2017

(65) Prior Publication Data

US 2018/0076980 A1    Mar. 15, 2018

Related U.S. Application Data

(63) Continuation of application No. 14/378,071, filed as application No. PCT/JP2013/001005 on Feb. 22, 2013, now Pat. No. 9,813,263.

(30) Foreign Application Priority Data

Mar. 9, 2012  (JP) .................................. 2012-052854

(51) Int. Cl.
    *H04L 25/02*    (2006.01)
    *H04J 13/22*    (2011.01)
    (Continued)

(52) U.S. Cl.
    CPC .......... *H04L 25/024* (2013.01); *H04B 7/024* (2013.01); *H04J 11/005* (2013.01);
    (Continued)

(58) Field of Classification Search
    CPC ..... H04L 25/024; H04L 5/0048; H04L 5/001; H04L 25/0204; H04L 2025/03426;
    (Continued)

(56) References Cited

U.S. PATENT DOCUMENTS

2010/0173642 A1    7/2010  Iwai et al.
2010/0284265 A1*  11/2010  Ogawa .................. H04J 11/005
                                                                      370/208

(Continued)

FOREIGN PATENT DOCUMENTS

JP    WO 2011007583 A1 *  1/2011  ............. H04B 7/024
JP         4624475 B2        2/2011
                (Continued)

OTHER PUBLICATIONS

3GPP TS 36.211 V10.2.0 (Jun. 2011), 3rd Generation Partnership Project; Technical Specification Group Radio Access Network; EUTRA; Phyiscal Channels and Modulation (Rel. 10).*

(Continued)

*Primary Examiner* — Chi Tang P Cheng
(74) *Attorney, Agent, or Firm* — Seed IP Law Group LLP

(57) ABSTRACT

A mobile terminal determine a reference signal sequence number based on a sequence length and a first selection reference value used for a first communication system that is different from a second communication system adapting a 3GPP release 10 or earlier. The first selection reference value is obtained from a sequence group number assigned to the terminal and different from a second selection reference value used for the second communication system. The mobile terminal generates a reference signal based on the (Continued)

ONE CELL determined reference signal sequence number and transmits the generated reference signal.

14 Claims, 22 Drawing Sheets

(51) Int. Cl.
| | |
|---|---|
| *H04L 5/00* | (2006.01) |
| *H04J 11/00* | (2006.01) |
| *H04J 13/00* | (2011.01) |
| *H04B 7/024* | (2017.01) |
| *H04L 25/03* | (2006.01) |
| *H04B 7/0452* | (2017.01) |
| *H04W 84/04* | (2009.01) |

(52) U.S. Cl.
CPC .......... *H04J 13/0062* (2013.01); *H04J 13/22* (2013.01); *H04L 5/0048* (2013.01); *H04L 25/0204* (2013.01); *H04B 7/0452* (2013.01); *H04L 5/001* (2013.01); *H04L 25/022* (2013.01); *H04L 25/0228* (2013.01); *H04L 25/03159* (2013.01); *H04L 2025/03426* (2013.01); *H04W 84/042* (2013.01)

(58) Field of Classification Search
CPC ..... H04B 7/024; H04B 7/0452; H04J 11/005; H04J 13/0062; H04J 13/22; H04W 84/042
USPC .......................................................... 370/252
See application file for complete search history.

(56) References Cited

U.S. PATENT DOCUMENTS

| | | |
|---|---|---|
| 2011/0182266 A1 | 7/2011 | Iwai et al. |
| 2011/0243191 A1 | 10/2011 | Nakao et al. |
| 2011/0280284 A1 | 11/2011 | Nakao et al. |
| 2012/0177090 A1* | 7/2012 | Iwai .................. H04B 7/024 375/219 |
| 2012/0195274 A1 | 8/2012 | Iwai et al. |
| 2012/0207077 A1 | 8/2012 | Iwai et al. |
| 2018/0069647 A1* | 3/2018 | Qu .................... H04J 13/0062 |

FOREIGN PATENT DOCUMENTS

| | | |
|---|---|---|
| WO | 2008/155904 A1 | 12/2008 |
| WO | 2009/041066 A1 | 4/2009 |
| WO | 2010/067598 A1 | 6/2010 |
| WO | 2010073617 A1 | 7/2010 |
| WO | 2011/007583 A1 | 1/2011 |
| WO | 2011/052222 A1 | 5/2011 |

OTHER PUBLICATIONS

3GPP TS 36.211 V10.2.0, "3rd Generation Partnership Project; Technical Specification Group Radio Access Network; Evolved Universal Terrestrial Radio Access (E-UTRA); Physical Channels and Modulation (Release 10)," Jun. 2011, 103 pages.
International Search Report dated May 21, 2013, for corresponding International Application No. PCT/JP2013/001005, 4 pages.
Panasonic, "Enhancement of PUSCH DMRS orthogonality," R1-120230, 3GPP TSG-RAN WG1 Meeting #68, Dresden, Germany, Feb. 6-10, 2012, 7 pages.

* cited by examiner

| RB | $N^{RS}_{ZC}$ | \multicolumn{2}{c}{Sequence Group Number u} | | | | | | |
|---|---|---|---|---|---|---|---|---|---|
| | | 0 | | 1 | | ... | 28 | | 29 | |

| RB | $N^{RS}_{ZC}$ | u=0 | u=1 | ... | u=28 | u=29 |
|---|---|---|---|---|---|---|
| 3 | 31 | 1 | 2 | ... | 29 | 30 |
| 4 | 47 | 2 | 3 | ... | 44 | 45 |
| 5 | 59 | 2 | | ... | 55 | 57 |
| 6 | 71 | 2 / 3 | 4 / 5 | ... | 66 / 67 | 68 / 69 |
| 8 | 89 | 2 / 3 | 5 / 6 | ... | 83 / 84 | 86 / 87 |
| ... | ... | ... | ... | ... | ... | ... |
| 90 | 1069 | 34 / 35 | 68 / 69 | ... | 1000 / 1001 | 1034 / 1035 |
| 96 | 1151 | 37 / 38 | 74 / 75 | ... | 1076 / 1077 | 1113 / 1114 |
| 100 | 1193 | 38 / 39 | 76 / 77 | ... | 1116 / 1117 | 1154 / 1155 |

FIG. 1

| RB | $N_{ZC}^{RS}$ | NON-CoMP UE SEQUENCE GROUP NUMBER u | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 3 | 31 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| 4 | 47 | 2 | 3 | 5 | 6 | 8 | 9 | 11 | 12 | 14 | 15 | 17 | 18 | 20 | 21 | 23 | 24 | 26 | 27 | 29 | 30 | 32 | 33 | 35 | 36 | 38 | 39 | 41 | 42 | 44 | 45 |
| 5 | 59 | 2 | 4 | 6 | 8 | 10 | 11 | 13 | 15 | 17 | 19 | 21 | 23 | 25 | 27 | 29 | 30 | 32 | 34 | 36 | 38 | 40 | 42 | 44 | 46 | 48 | 49 | 51 | 53 | 55 | 57 |
| 6 | 71 | 2 | 5 | 7 | 9 | 11 | 14 | 16 | 18 | 21 | 23 | 25 | 27 | 30 | 32 | 34 | 37 | 39 | 41 | 44 | 46 | 48 | 50 | 53 | 55 | 57 | 60 | 62 | 64 | 66 | 69 |

NON-CoMP UE SEQUENCE GROUP

FIG. 15A

| RB | $N_{ZC}^{RS}$ | CoMP UE SEQUENCE GROUP NUMBER u | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 3 | 31 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| 4 | 47 | 1 | 2 | 4 | 5 | 7 | 8 | 10 | 11 | 13 | 14 | 16 | 17 | 19 | 20 | 22 | 24 | 25 | 27 | 28 | 30 | 31 | 33 | 34 | 36 | 37 | 39 | 40 | 42 | 43 | 45 |
| 5 | 59 | 1 | 3 | 5 | 7 | 9 | 10 | 12 | 14 | 16 | 18 | 20 | 22 | 24 | 26 | 28 | 30 | 31 | 33 | 35 | 37 | 39 | 41 | 43 | 45 | 47 | 49 | 50 | 52 | 54 | 56 |
| 6 | 71 | 1 | 3 | 6 | 8 | 10 | 13 | 15 | 17 | 19 | 22 | 24 | 26 | 29 | 31 | 33 | 36 | 38 | 40 | 42 | 45 | 47 | 49 | 52 | 54 | 56 | 58 | 61 | 63 | 65 | 68 |

CoMP UE SEQUENCE GROUP

FIG. 15B

| RB | $N_{ZC}^{RS}$ | \multicolumn{30}{c}{CoMP UE SEQUENCE GROUP NUMBER u} |
|---|---|---|---|---|---|---|---|---|---|---|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| 3 | 71 | 1 | 3 | 6 | 8 | 10 | 13 | 15 | 17 | 19 | 22 | 24 | 26 | 29 | 31 | 33 | 36 | 38 | 40 | 42 | 45 | 47 | 49 | 52 | 54 | 56 | 58 | 61 | 63 | 65 | 68 |
| 4 | 89 | 1 | 4 | 7 | 10 | 13 | 16 | 19 | 22 | 24 | 27 | 30 | 33 | 36 | 39 | 42 | 45 | 47 | 50 | 53 | 56 | 59 | 62 | 65 | 67 | 70 | 73 | 76 | 79 | 82 | 85 |
| 5 | 113 | 2 | 5 | 9 | 13 | 16 | 20 | 24 | 27 | 31 | 35 | 38 | 42 | 46 | 49 | 53 | 57 | 60 | 64 | 67 | 71 | 75 | 78 | 82 | 86 | 89 | 93 | 97 | 100 | 104 | 108 |
| 6 | 71 | 1 | 3 | 6 | 8 | 10 | 13 | 15 | 17 | 19 | 22 | 24 | 26 | 29 | 31 | 33 | 36 | 38 | 40 | 42 | 45 | 47 | 49 | 52 | 54 | 56 | 58 | 61 | 63 | 65 | 68 |

FIG. 16

| RB | $N_{ZC}^{RS}$ | SEQUENCE GROUP NUMBER u | | | | |
|---|---|---|---|---|---|---|
| | | 0 | 1 | ... | 28 | 29 |
| 3 | 71 | 1 | 3 | | 65 | 68 |
| 4 | 89 | 1 | 4 | | 82 | 85 |
| 5 | 113 | 2 | 5 | | 104 | 108 |
| 6 | 71 | 1 | 3 | | 65 | 68 |
| 8 | 89 | 1 | 4 | | 82 | 85 |
| ... | | | | | | |
| 90 | 1069 | 17 | 52 | | 983 | 1017 |
| 96 | 1151 | 19 | 56 | | 1058 | 1095 |
| 100 | 1193 | 19 | 58 | | 1097 | 1135 |

FIG. 22

TERMINAL DEVICE, WIRELESS TRANSMISSION METHOD, BASE STATION DEVICE, AND CHANNEL ESTIMATION METHOD

TECHNICAL FIELD

The present invention relates to a terminal apparatus and a radio transmission method for transmitting a reference signal, and a base station apparatus and a channel estimation method for performing channel estimation using a reference signal.

BACKGROUND ART

3GPP LTE (3rd Generation Partnership Project Long-term Evolution) adopts a ZC (Zadoff-Chu) sequence as a signal sequence used for a reference signal for data demodulation (DMRS: DeModulation-Reference Signal) used on an uplink. The ZC sequence is used when the transmission bandwidth is 3 RBs (resource blocks) or more.

On an LTE uplink, many DMRS sequences are divided into 30 sequence groups in each transmission bandwidth (1 to 110 RBs). In each sequence group, as shown in FIG. 1, a transmission bandwidth (more specifically, the number of RBs allocated) and a DMRS sequence are associated with each other. Respective sequence groups are assigned different numbers (sequence group number u=0 to 29), and as shown in FIG. 2, each cell is assigned one sequence group from among #0 to 29. Such sequence group assignment is called "cell-specific sequence group assignment" or "cell-specific assignment." A base station (which may also be called "eNB") broadcasts cell IDs to terminals (which may also be called "UE (User Equipment)") in the cell. Since the cell IDs and 30 sequence group numbers are uniquely assigned with each other beforehand, terminals in the cell can know cell-specific sequence group numbers from the broadcast cell-specific IDs. Even when the transmission bandwidth is changed, the terminal can identify a DMRS sequence number from only a sequence group number. Thus, the cell-specific assignment can reduce signaling of sequence numbers. In the cell-specific assignment, different sequence groups are assigned to nearby cells in order to reduce inter-cell interference.

The ZC sequence is a kind of CAZAC (Constant Amplitude and Zero Auto-correlation Code) sequence and is expressed by following equation 1.

[1]
$$x_q(m) = e^{-j\frac{\pi q m(m+1)}{N_{ZC}^{RS}}}, \ 0 \leq m \leq N_{ZC}^{RS}-1 \quad \text{(Equation 1)}$$

In equation 1, $N_{ZC}^{RS}$ is a sequence length of a ZC sequence, q is a ZC sequence number, and m is an element number of the ZC sequence. Sequence length $N_{ZC}^{RS}$ is a maximum prime number that does not exceed the number of subcarriers in a transmission bandwidth of DMRS, and ($N_{ZC}^{RS}-1$) ZC sequences having good cross-correlation characteristics can be generated. ZC sequence number q is calculated by equation 2.

(Equation 2)
$$q = \lfloor \bar{q}+1/2 \rfloor + v \cdot (-1)^{\lfloor 2\bar{q} \rfloor}$$

$$\bar{q} = N_{ZC}^{RS} \cdot (u+1)/31 \quad [2]$$

Here, regarding v, v=0 when the transmission bandwidth is 5 RBs or less and v=1 when the transmission bandwidth is 6 RBs or more. Sequence group number u is an integer of u=0 to 29. Number u is associated with a cell ID of a serving cell and all UEs in the cell each use one of sequences that belong to a common sequence group.

Equation 2 means calculating a ZC sequence number (when v=0) corresponding to $q/N_{ZC}^{RS}$, which is a ratio between a ZC sequence number and a ZC sequence length closest to "(u+1)/31," and a ZC sequence number (when v=1) corresponding to $q/N_{ZC}^{RS}$ second closest to "(u+1)/31." Thus, as ZC sequences of each RB, a plurality of sequences having close $q/N_{ZC}^{RS}$ values are assigned to the same sequence group. In the following description, a value that serves as a reference for calculating a ZC sequence number such as "(u+1)/31" of equation 2 is called "sequence selection reference value." Here, 31 is a maximum prime number (minimum ZC sequence length) that does not exceed the number of subcarriers (=36) assigned to minimum RBs (=3 RBs) of the sequence group. Thus, the sequence selection reference value means a ratio between a sequence group number and a minimum ZC sequence length. Furthermore, a ratio between a ZC sequence number that determines a ZC sequence and the ZC sequence length, that is, "$q/N_{ZC}^{RS}$" is called a "sequence determination value."

Sequences of close ZC sequence $q/N_{ZC}^{RS}$ have a feature of having similar waveforms and a high cross-correlation between sequences. Thus, a sequence group used in one cell is configured of a combination of ZC sequences having a high cross-correlation between ZC sequences, and the probability that sequences having a high cross-correlation may be used in neighboring cells is thereby reduced, making it possible to reduce interference between neighboring cells (e.g., see PTL 1).

DMRS used in 3GPP LTE is transmitted with a transmission bandwidth which is an integer multiple of 1 RB consisting of 12 subcarriers. Thus, the sequence length of a ZC sequence which is a prime number does not coincide with the number of subcarriers corresponding to a transmission bandwidth of DMRS. Thus, as shown in FIG. 3, a sequence obtained by copying (called "extension") the top portion of a ZC sequence having a prime number sequence length to the end portion is used as DMRS to be actually transmitted. For example, as DMRS to be transmitted in 3 RBs (36 subcarriers), a ZC sequence having sequence length $N_{ZC}^{RS}$ of 31 is used and DMRS is generated by copying the first five elements to the end portion.

In LTE-Advanced, which is an evolved version of LTE, a heterogeneous network (HetNet) using a plurality of base stations providing coverage areas in different sizes is under study to achieve a further capacity improvement. In the operation of HetNet, a pico cell having low transmission power is deployed within a coverage area of a macro cell having high transmission power. The macro cell may also be called "HPN (High Power Node)." The pico cell may also be called "LPN (Low Power Node)" or "low power RRH (Remote Radio Head)."

In LTE-Advanced, application of CoMP (Coordinated multiple point transmission and reception) is also under study, which is a communication scheme in which a plurality of cells (base stations) cooperate to transmit and receive signals to and from a terminal in a HetNet environment. CoMP is mainly intended to improve the throughput of a user located at a cell edge. For example, in the case of uplink CoMP (UL_CoMP), a plurality of cells (which may also be called "base stations" or "reception points") cooperate to receive uplink signals from one terminal, and received signals are combined by a plurality of cells to improve receiving quality.

In UL_CoMP, the introduction of MU-MIMO (Multiple User-Multiple Input Multiple Output) communication is under study to achieve a further system performance improvement effect. MIMO communication is a technique in which transmitting and receiving sides are provided with a plurality of antennas to enable different signal sequences to be simultaneously and spatially multiplexed at the same frequency. MU-MIMO communication is a technique in which MIMO communication is carried out by a plurality of terminals to which UL_CoMP is applied, that is, terminals that cooperate to receive and combine transmission signals in a plurality of cells (hereinafter, may also be referred to as "CoMP_UE") and a base station. MU-MIMO communication can improve the frequency utilization efficiency of the system.

In MU-MIMO communication, it is necessary to transmit DMRSs which are orthogonalized among terminals to demultiplex signals of different terminals. As a method of orthogonalizing DMRSs, a ZC sequence (CS-ZC sequence) may be used in which a different cyclic shift (CS) for each terminal is applied. Setting a value larger than a maximum propagation delay time of transmission signals of terminals as a cyclic shift value makes it possible to orthogonalize a plurality of CS-ZC sequences generated from ZC sequences of the same sequence group.

However, when UL_CoMP is applied, DMRSs need to be received from a plurality of different cells. For this reason, the aforementioned cell-specific sequence group assignment may cause ZC sequence numbers of CoMP_UE to differ from each other, making it impossible to orthogonalize CS-ZC sequences to be used as DMRSs.

Thus, as shown in FIG. 4, studies are being carried out on the possibility of introducing UE-specific sequences (sequence group #17 in FIG. 4) in which sequences are indicated individually for the respective terminals instead of cell-specific sequences (sequence groups #1 and #2 in FIG. 4) for CoMP_UE. Assigning the same sequence group to terminals that perform CoMP reception allows DMRSs to be orthogonalized among CoMP_UEs.

CITATION LIST

Patent Literature

PTL 1
Japanese Patent Publication No. 4624475

Non-Patent Literature

NPL 1
3GPP TS36.211 V10.2.0, "Physical Channels and Modulation (Release 10)," 5.5 Reference Signals, June 2011

SUMMARY OF INVENTION

Technical Problem

However, when a certain sequence group is selected from existing sequence groups and assigned to CoMP_UE, there is a problem in that, even when a sequence group which is not used in the neighborhood is assigned, a sequence group reuse distance is reduced. The term "reuse distance" refers to a spatial distance from one cell to the nearest cell to which the same sequence group is applied. When the reuse distance becomes smaller, the inter-cell interference between DMRSs used in CoMP_UE and Non-CoMP_UE increases. This situation is shown in FIG. 5 and FIG. 6.

As shown in FIG. 5, when UL_CoMP is not applied, a different sequence group is applied to each plurality of cells (base stations) that form one cell cluster (cell-specific sequence assignment) as described above. Thus, the reuse distance between sequence groups increases.

In contrast, as shown in FIG. 6, when UL_CoMP is applied, the same sequence group is applied to a plurality of cells that cooperate to receive transmission signals of CoMP_UE (UE-specific sequence assignment).

FIG. 6 illustrates an example in which sequence group #17 is UE-specifically assigned to UE located on a boundary between cells using sequence groups #1 and #3 through cell-specific assignment in order to apply UL_CoMP. In this case, the distance (sequence group reuse distance) between a UE using sequence group #17 through UE-specific assignment, that is, a UE located on a boundary between cells using sequence groups #1 and #3 and a cell using sequence group #17 through cell-specific assignment becomes smaller. A decrease in the distance means a decrease in distance attenuation of signals. Therefore, inter-cell interference between DMRSs increases between CoMP_UE using sequence group #17 through UE-specific assignment and non-CoMP_UE using sequence group #17 through cell-specific assignment.

The problems relating to uplink DMRS, which is one of reference signal sequences, have been described so far. However, such problems also occur with an uplink sounding reference signal (SRS) which is another reference signal sequence.

An object of the present invention is to provide a terminal apparatus, a transmission method, a base station apparatus and a channel estimation method make possible UE-specific reference signal sequence assignment, and transmission and reception of radio signals without any increase in inter-cell interference, when CoMP is applied.

Solution to Problem

A terminal apparatus according to an aspect of the present invention includes: a reference signal generating section that selects, when coordinated-reception by a plurality of base stations is not applied to the terminal apparatus, a reference signal sequence determined from a selection reference value corresponding to a sequence group number assigned to a cell to which the terminal apparatus belongs among a plurality of selection reference values each being a ratio between a value corresponding to a sequence group number to which a plurality of reference signal sequences belong and a sequence length of a reference signal sequence of a minimum transmission bandwidth in the sequence group as a non-coordinated-reception reference signal sequence, that selects, when coordinated-reception by the plurality of base stations is applied to the terminal apparatus, a reference signal sequence determined from one or a plurality of intermediate selection reference values set between two adjacent selection reference values corresponding to a sequence group number assigned specifically to the terminal apparatus among the plurality of selection reference values as a coordinated-reception reference signal sequence different from the non-coordinated-reception reference signal sequence, and that generates a reference signal based on the selected reference signal sequence; and a transmitting section that transmits the generated reference signal.

A radio transmission method according to an aspect of the present invention includes: selecting, when coordinated-reception by a plurality of base stations is not applied to a terminal apparatus, a reference signal sequence determined from a selection reference value corresponding to a sequence group number assigned to a cell to which the terminal apparatus belongs among a plurality of selection reference values each being a ratio between a value corresponding to a sequence group number to which a plurality of reference signal sequences belong and a sequence length of a reference signal sequence of a minimum transmission bandwidth in the sequence group as a non-coordinated-reception reference signal sequence, and selecting, when coordinated-reception by the plurality of base stations is applied to the terminal apparatus, a reference signal sequence determined from one or a plurality of intermediate selection reference values set between two adjacent selection reference values corresponding to a sequence group number assigned specifically to the terminal apparatus among the plurality of selection reference values as a coordinated-reception reference signal sequence different from the non-coordinated-reception reference signal sequence; generating a reference signal based on the selected reference signal sequence; and transmitting the generated reference signal.

A base station apparatus according to an aspect of the present invention includes: a setting section that selects, when coordinated-reception by a plurality of base stations is not applied to a terminal apparatus, a reference signal sequence determined from a selection reference value corresponding to a sequence group number assigned to a cell to which the terminal apparatus belongs among a plurality of selection reference values each being a ratio between a value corresponding to a sequence group number to which a plurality of reference signal sequences belong and a sequence length of a reference signal sequence of a minimum transmission bandwidth in the sequence group as a non-coordinated-reception reference signal sequence, and that selects, when the coordinated-reception by the plurality of base stations is applied to the terminal apparatus, a reference signal sequence determined from one or a plurality of intermediate selection reference values set between two adjacent selection reference values corresponding to a sequence group number assigned specifically to the terminal apparatus among the plurality of selection reference values as the coordinated-reception reference signal sequence different from the non-coordinated-reception reference signal sequence; a receiving section that receives a signal transmitted from the terminal apparatus; and a channel estimation section that performs channel estimation based on the received signal and the reference signal sequence selected by the setting section.

A channel estimation method according to an aspect of the present invention includes: selecting, when coordinated-reception by a plurality of base stations is not applied to a terminal apparatus, a reference signal sequence determined from a selection reference value corresponding to a sequence group number assigned to a cell to which the terminal apparatus belongs among a plurality of selection reference values each being a ratio between a value corresponding to a sequence group number to which a plurality of reference signal sequences belong and a sequence length of a reference signal sequence of a minimum transmission bandwidth in the sequence group as a non-coordinated-reception reference signal sequence, and selecting, when coordinated-reception by the plurality of base stations is applied to the terminal apparatus, a reference signal sequence determined from one or a plurality of intermediate selection reference values set between two adjacent selection reference values corresponding to a sequence group number assigned specifically to the terminal apparatus among the plurality of selection reference values as a coordinated-reception reference signal sequence different from the non-coordinated-reception reference signal sequence; receiving a signal transmitted from the terminal apparatus; and performing channel estimation based on the received signal and the selected reference signal sequence.

Advantageous Effects of Invention

According to the present invention, it is possible to perform terminal-specific reference signal sequence assignment, and transmission and reception of radio signals without any increase in inter-cell interference, when coordinated-reception is applied.

BRIEF DESCRIPTION OF DRAWINGS

FIG. 1 is a table illustrating sequence numbers of ZC sequences assigned to each sequence group in cell-specific sequence assignment;

FIGS. 15A and 15B illustrate results in cases where a ZC sequence selection method according to Embodiment 1 is applied when the transmission bandwidth is 3 RBs to 6 RBs;

FIG. 16 illustrates results of selection of ZC sequences according to Embodiment 2 when the transmission bandwidth is 3 RBs to 6 RBs;

FIG. 22 is a table illustrating a variation of the method of assigning a CoMP_UE ZC sequence.

DESCRIPTION OF EMBODIMENTS

Hereinafter, embodiments of the present invention will be described in detail with reference to the accompanying drawings.

Embodiment 1

[Overview of Communication System]

A communication system according to Embodiment 1 of the present invention includes a transmitting apparatus and a receiving apparatus. Especially, the present embodiment will be described assuming that the transmitting apparatus is terminal 100 and the receiving apparatus is base station 200. This communication system is, for example, an LTE-Advanced system. Terminal 100 is, for example, a terminal compliant with the LTE-Advanced system and base station 200 is, for example, a base station compliant with the LTE-Advanced system. For example, when terminal 100 operates, for example, as a CoMP_UE which adopts UL_CoMP, signals transmitted from terminal 100 are received by a plurality of base station 200 in cooperation.

[Configuration of Terminal 100]

Figure 2:
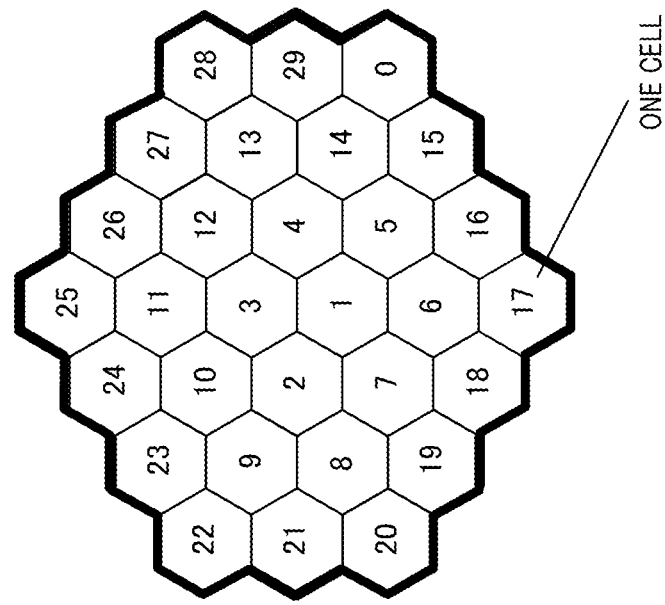
FIG. 2 illustrates an example of a sequence group assigned to a plurality of cells.
Figure 3:
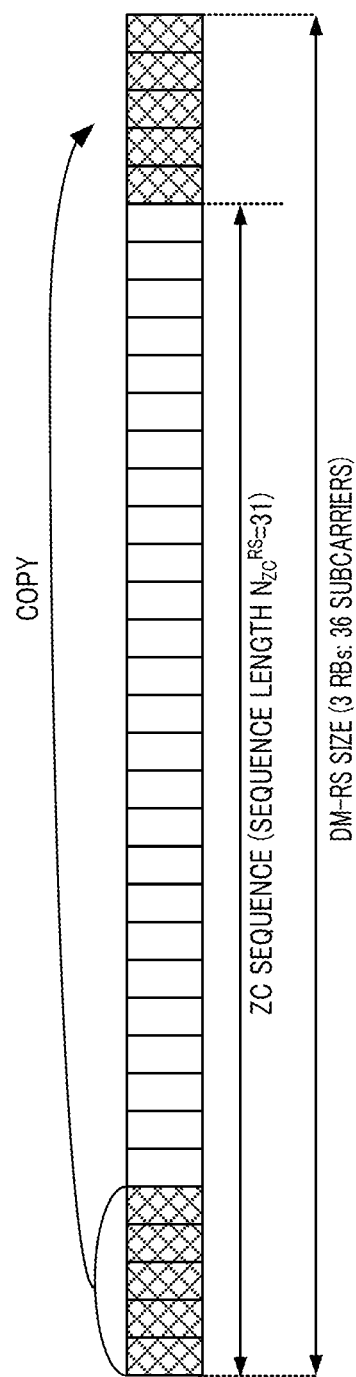
FIG. 3 illustrates extension processing on a ZC sequence to compensate for a difference between a transmission bandwidth and a sequence length.
Figure 4:
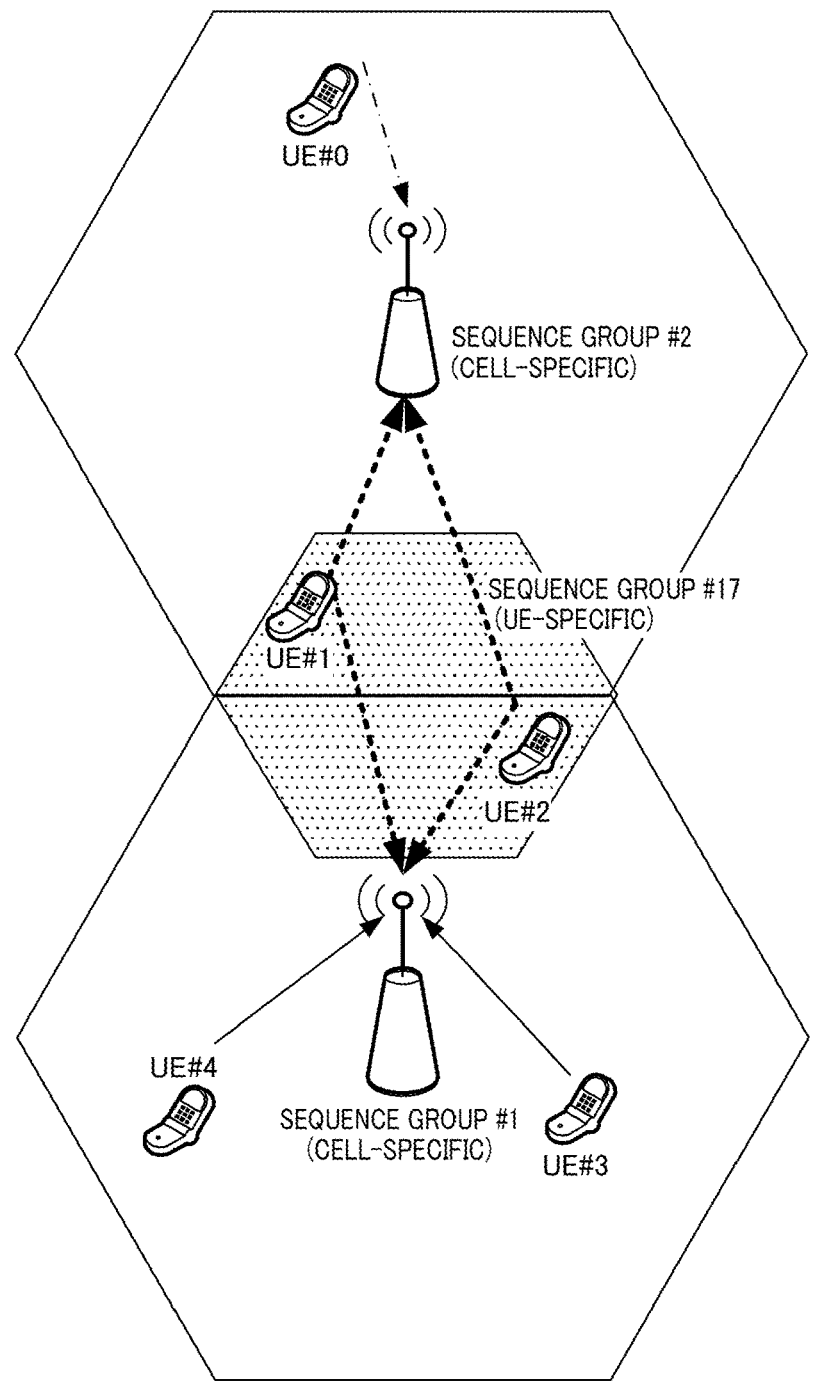
FIG. 4 illustrates a situation in which cell-specific sequences of the same sequence group are assigned to a plurality of terminals to perform CoMP.
Figure 5:
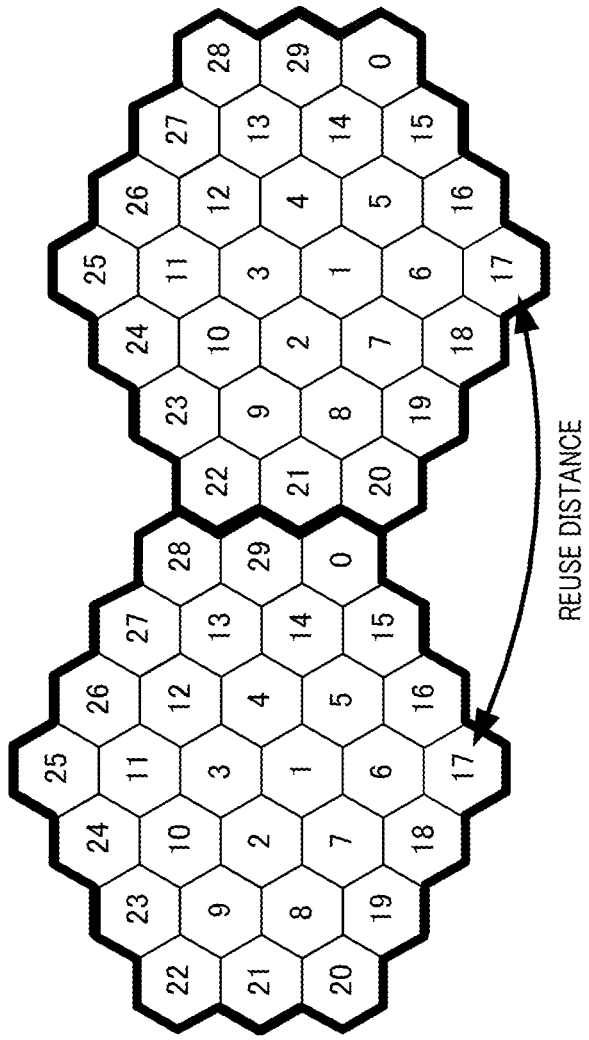
FIG. 5 illustrates a reuse distance when cell-specific sequence assignment is adopted in non-CoMP.
Figure 6:
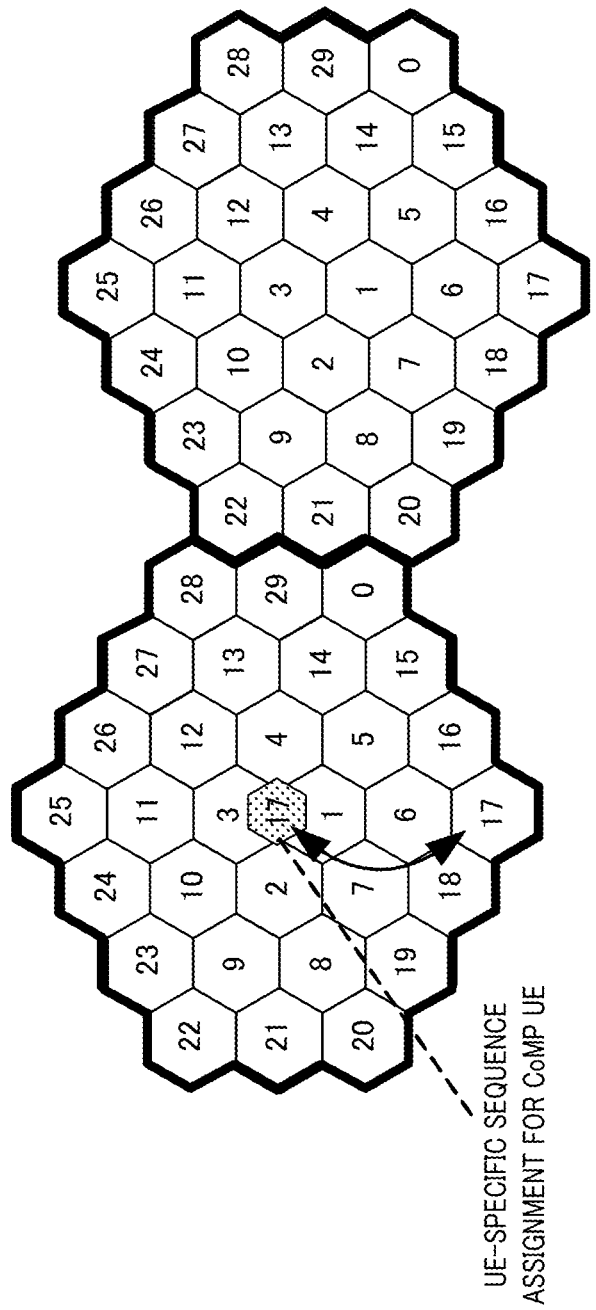
FIG. 6 illustrates a reuse distance when UE-specific assignment is adopted in UL_CoMP.
Figure 7:
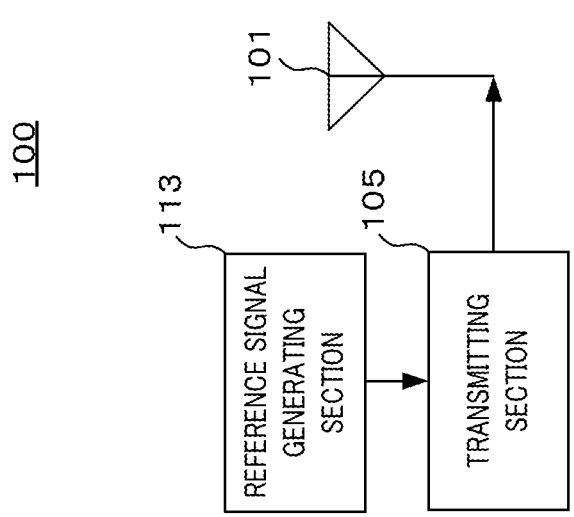
FIG. 7 is a block diagram illustrating main components of terminal 100 according to Embodiment 1 of the present invention.

FIG. 7 is a block diagram illustrating main components of terminal 100 according to Embodiment 1 of the present invention.

As shown in FIG. 7, terminal 100 according to the present embodiment 1 is provided with antenna 101, reference signal generating section 113 and transmitting section 105.

Reference signal generating section 113 sets a ZC sequence to be used for DMRS first. More specifically, reference signal generating section 113 sets a non-CoMP_UE reference signal sequence when CoMP (corresponding to coordinated-reception) is not applied to terminal 100. Of a plurality of selection reference values (u+1)/31, a reference signal sequence determined from a selection reference value corresponding to a sequence group number assigned to the cell to which terminal 100 belongs is selected as this reference signal sequence. The "plurality of selection reference values (u+1)/31" are ratios between values u+1 (where, u is 0 to 29) corresponding to each sequence group number to which a plurality of reference signal sequences belong and sequence length 31 of a reference signal sequence of a minimum transmission bandwidth in the sequence group. When CoMP is applied to terminal 100, reference signal generating section 113 sets a CoMP_UE reference signal sequence. Of the plurality of selection reference values (u+1)/31, a reference signal sequence determined from one or a plurality of intermediate selection reference values set between two adjacent selection reference values corresponding to a sequence group number individually assigned to terminal 100 is selected as this reference signal sequence. Reference signal generating section 113 generates DMRS based on the selected reference signal sequence and sends the DMRS to transmitting section 105.

Transmitting section 105 transmits the generated DMRS to base station 200 via antenna 101.

Figure 8:
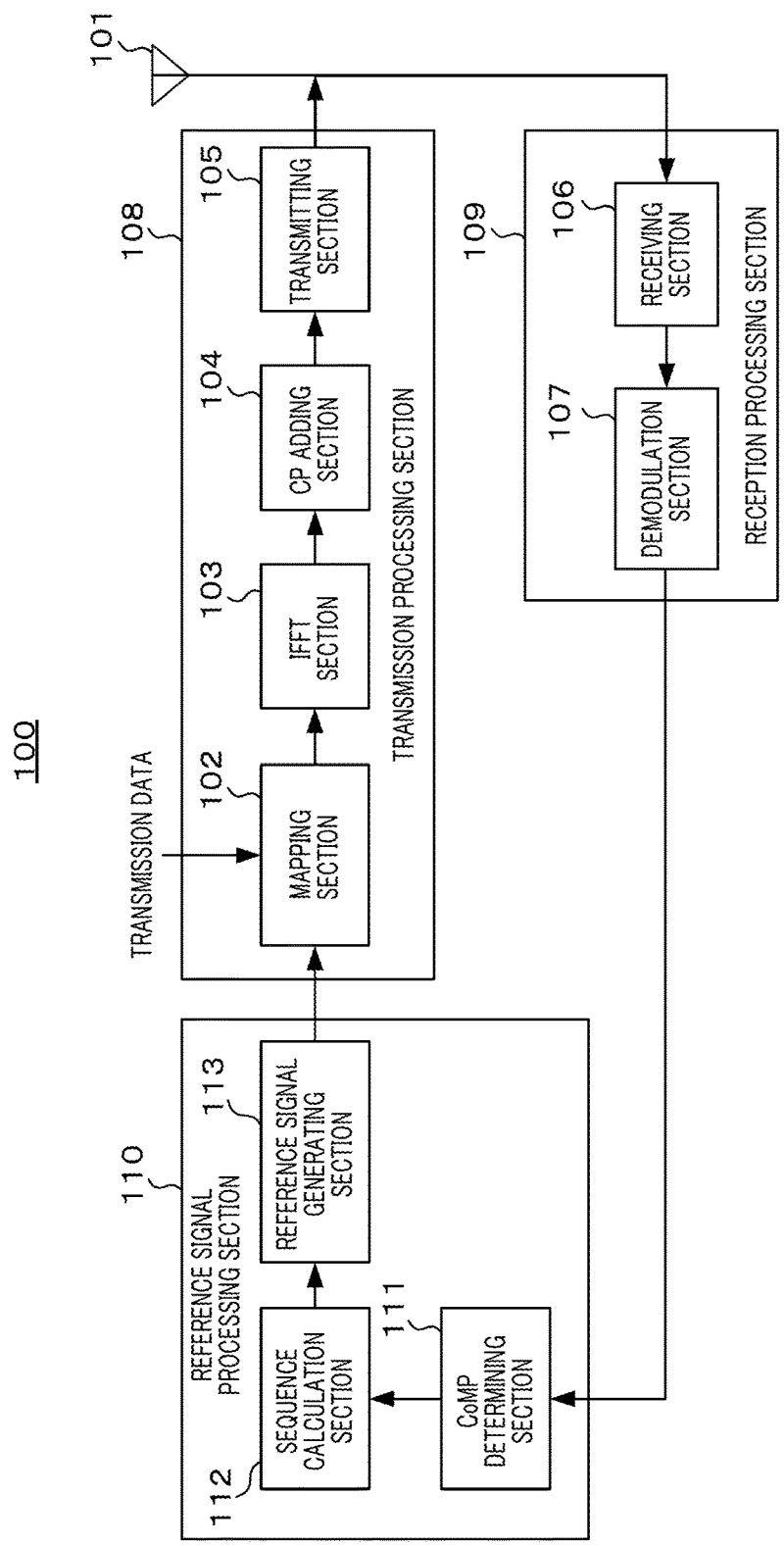
FIG. 8 is a block diagram illustrating a configuration of terminal 100 according to Embodiment 1.

FIG. 8 is a block diagram illustrating a configuration of terminal 100 according to Embodiment 1.

More specifically, as shown in FIG. 8, terminal 100 includes antenna 101, reference signal processing section 110, mapping section 102, IFFT (Inverse Fast Fourier Transform) section 103, CP adding section 104, transmitting section 105, receiving section 106 and demodulation section 107. Reference signal processing section 110 includes CoMP determining section 111, sequence calculation section 112 and reference signal generating section 113.

Of these sections, mapping section 102, IFFT section 103, CP adding section 104 and transmitting section 105 constitute transmission processing section 108. Receiving section 106 and demodulation section 107 constitute reception processing section 109. Next, details of the respective sections will be described.

Receiving section 106 receives a signal transmitted from base station 200 via antenna 101, applies reception processing such as down-conversion, and/or A/D conversion to the received signal and outputs the received signal subjected to the reception processing to demodulation section 107.

Demodulation section 107 demodulates a control signal included in the received signal inputted from receiving section 106 and outputs the demodulated control information to CoMP determining section 111. This control signal includes information indicating whether coordinated-reception is applied or not, and is transmitted from base station 200. Demodulation section 107 demodulates received data included in the received signal inputted from receiving section 106 and sends the received data to a baseband section.

CoMP determining section 111 determines, based on the control information indicated from base station 200, whether coordinated-reception by a plurality of receiving apparatuses (base stations 200) is applied to the terminal (described as "CoMP_UE") or not (described as "non-CoMP_UE"). CoMP determining section 111 outputs the determination result to sequence calculation section 112.

In the communication system of the present embodiment, for example, base station 200 is assumed to explicitly indicate whether terminal 100 is a CoMP_UE or non-CoMP_UE to terminal 100 beforehand. In this case, CoMP determining section 111 can make the above-described determination based on the indicated information. CoMP determining section 111 may also implicitly determine, from other information set in terminal 100, whether the terminal is CoMP_UE or non-CoMP_UE. As the other information, for example, a UE-specific sequence group number, UE-specific sequence number or virtual cell ID to obtain a sequence group number is applicable. In this case, CoMP determining section 111 can determine that the terminal is CoMP_UE if the information is set or can be set and determine that the terminal is non-CoMP_UE if the information is not set or cannot be set.

Sequence calculation section 112 calculates a transmission bandwidth (=$M^{RS}$ [subcarriers]) of DMRS indicated from base station 200, ZC sequence length $N_{ZC}^{RS}$ [subcarriers] depending on whether the terminal is CoMP_UE or non-CoMP_UE, and ZC sequence number q or q'. Sequence calculation section 112 outputs the calculation result to reference signal generating section 113. Here, ZC sequence length $N_{ZC}^{RS}$ is calculated as a maximum prime number which is smaller than $M^{RS}$. For example, $N_{ZC}^{RS}=71$ when $M^{RS}=72$ (6 RBs). The method of calculating ZC sequence number q or q' will be described in detail later.

Figure 9:
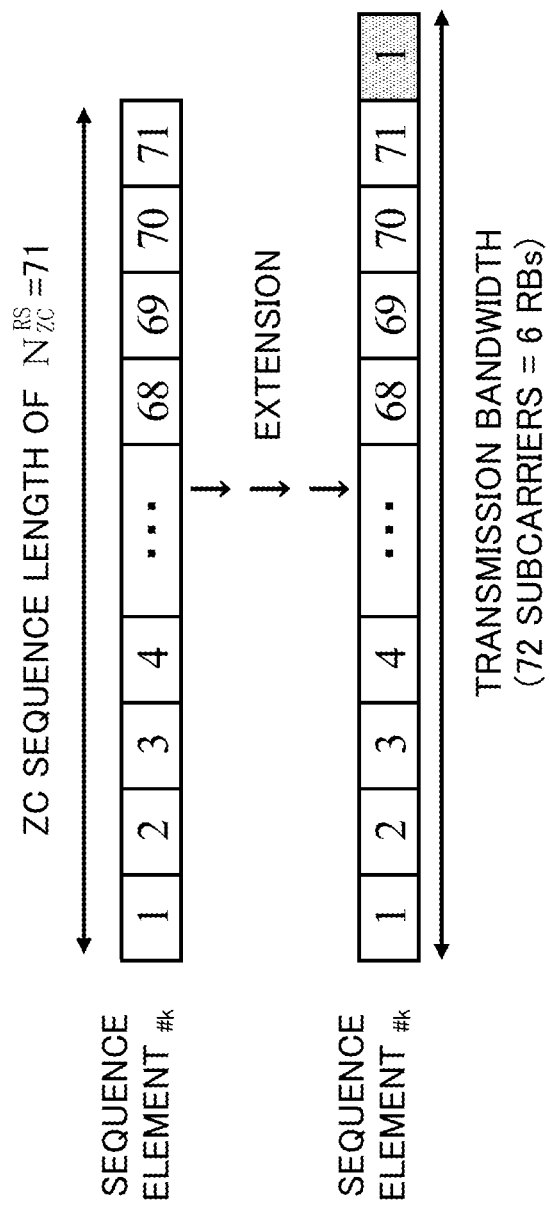
FIG. 9 illustrates an example of extension processing on a ZC sequence in accordance with a transmission bandwidth of 6 RBs.

Reference signal generating section 113 generates a ZC sequence according to equation 1 based on ZC sequence length $N_{ZC}^{RS}$ and ZC sequence numbers q and q' set by sequence calculation section 112. Furthermore, reference signal generating section 113 extends the generated ZC sequence of length $N_{ZC}^{RS}$ to transmission bandwidth $M^{RS}$ to create a DMRS sequence, and outputs the DMRS sequence to mapping section 102. As the extension method as shown in FIG. 9, a method is adopted whereby, for example, the leading portion of the ZC sequence is copied (extended) to the rear portion. FIG. 9 illustrates an example in which extension processing is applied to the ZC sequence in accordance with a transmission bandwidth of 6 RBs.

Mapping section 102 maps the generated DMRS to a band corresponding to a transmission band of terminal 100 and outputs the mapped signal to IFFT section 103. In addition, mapping section 102 maps the transmission data to a band corresponding to the transmission band of terminal 100 and outputs the mapped signal to IFFT section 103.

IFFT section 103 applies IFFT processing to the signal inputted from mapping section 102 and outputs the signal subjected to the IFFT processing to CP (Cyclic Prefix) adding section 104.

CP adding section 104 adds the same signal as the rear end portion of the signal after the IFFT to the leading portion as a CP and outputs the signal to transmitting section 105.

Transmitting section 105 applies transmission processing such as D/A conversion, up-conversion, and/or amplification to the signal with the CP and transmits the signal subjected to the transmission processing via antenna 101. The signal transmitted includes transmission data and DMRS.

[Configuration of Base Station 200]

Figure 10:
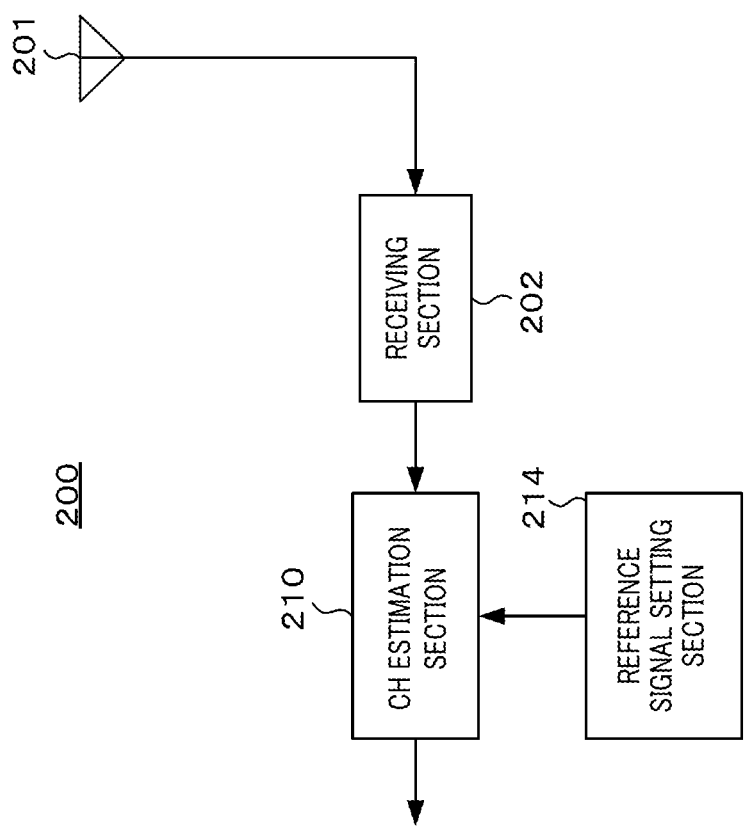
FIG. 10 is a block diagram illustrating main components of base station 200 according to Embodiment 1 of the present invention.

FIG. 10 is a block diagram illustrating main components of base station 200 according to Embodiment 1 of the present invention.

As shown in FIG. 10, base station 200 according to present Embodiment 1 is provided with antenna 201, receiving section 202, reference signal setting section 214 and CH estimation section 210.

Reference signal setting section 214 sets a ZC sequence to be used by a UE for DMRS. More specifically, when CoMP is not applied to the UE, reference signal setting section 214 sets a non-CoMP_UE reference signal sequence in the UE. Of a plurality of selection reference values (u+1)/31, a reference signal sequence determined from a selection reference value corresponding to a sequence group number assigned to the cell to which terminal 100 belongs is selected as this reference signal sequence. The "plurality of selection reference values (u+1)/31" are ratios between values u+1 (where, u is 0 to 29) corresponding to each sequence group number to which a plurality of reference signal sequences belong and sequence length 31 of a reference signal sequence of a minimum transmission bandwidth in the sequence group. When CoMP is applied to the UE, reference signal setting section 214 sets a CoMP_UE reference signal sequence. Of a plurality of selection reference values (u+1)/31, a reference signal sequence determined from one or a plurality of intermediate selection reference values set between two adjacent selection reference values corresponding to a sequence group number individually assigned to terminal 100 is selected as this reference signal sequence. Reference signal setting section 214 sends the selection result to CH estimation section 210.

CH estimation section 210 performs channel estimation for coherent detection from DMRS included in the received signal based on the selection result from reference signal setting section 214.

Figure 11:
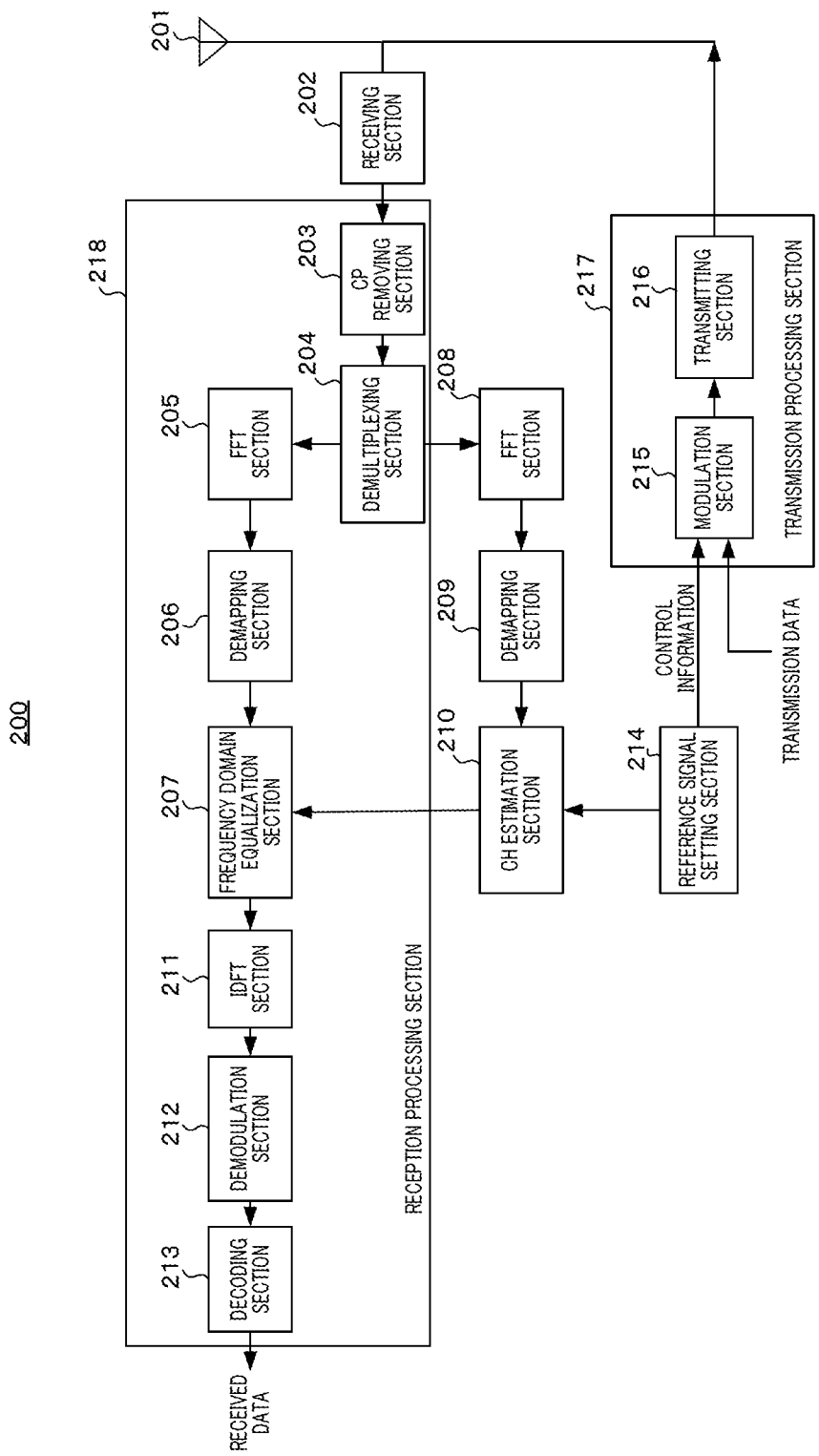
FIG. 11 is a block diagram illustrating a configuration of base station 200 according to Embodiment 1.

FIG. 11 is a block diagram illustrating a configuration of base station 200 according to Embodiment 1.

More specifically, as shown in FIG. 11, base station 200 is provided with antenna 201, receiving section 202, CP removing section 203, demultiplexing section 204, FFT sections 205 and 208, demapping sections 206 and 209, CH estimation section 210, frequency domain equalization section 207, IDFT (Inverse Discrete Fourier Transform) section 211, demodulation section 212, decoding section 213, reference signal setting section 214, modulation section 215 and transmitting section 216.

Of these sections, modulation section 215 and transmitting section 216 constitute transmission processing section 217. CP removing section 203, demultiplexing section 204, FFT (Fast Fourier transform) sections 205 and 208, demapping sections 206 and 209, frequency domain equalization section 207, IDFT section 211, demodulation section 212 and decoding section 213 constitute reception processing section 218. Reference signal setting section 214 includes a sequence calculation section (not shown). Next, details of the sections will be described.

Reference signal setting section 214 has substantially the same configuration as that of reference signal processing section 110 (FIG. 8) of terminal 100. Reference signal setting section 214 determines whether terminal 100 is a CoMP_UE or not, generates a DMRS sequence corresponding to CoMP_UE or non-CoMP_UE (the same sequence as the DMRS sequence transmitted by terminal 100) and outputs the DMRS sequence to CH estimation section 210. Reference signal setting section 214 outputs control information to implicitly or explicitly inform terminal 100 of whether terminal 100 is CoMP_UE or non-CoMP_UE to modulation section 215.

Modulation section 215 modulates the control information and transmission data outputted from reference signal setting section 214 and outputs the modulated signal to transmitting section 216.

Transmitting section 216 applies transmission processing such as D/A conversion, up-conversion, and/or amplification to the signal outputted from the modulation section and transmits the signal subjected to the transmission processing from antenna 201.

Receiving section 202 applies reception processing such as down-conversion, A/D conversion to a signal received via antenna 201 and outputs the signal subjected to the reception processing to CP removing section 203. The received signal includes a data signal and DMRS.

CP removing section 203 removes a CP from the signal subjected to the reception processing and outputs the signal without the CP to demultiplexing section 204.

Demultiplexing section 204 demultiplexes the signal inputted from CP removing section 203 into a DMRS and data signal. Demultiplexing section 204 outputs the data signal to FFT section 205 and outputs the DMRS to other FFT section 208.

FFT section 208 on the DMRS side applies FFT processing to the DMRS inputted from demultiplexing section 204, to transform the DMRS from a time domain signal into a frequency domain signal. FFT section 208 outputs the DMRS transformed into the frequency domain signal to demapping section 209.

Demapping section 209 extracts a portion corresponding to a transmission band of each terminal 100 from the DMRS in the frequency domain inputted from FFT section 208 and outputs the extracted DMRS to CH estimation section 210.

CH estimation section 210 performs channel estimation (calculation of a channel estimate value) for synchronization detection of an uplink physical channel using the DMRS. To be more specific, CH estimation section 210 divides the DMRS inputted from demapping section 209 by the DMRS sequence inputted from reference signal setting section 214 first and applies IFFT processing to the division result (correlation value). Next, CH estimation section 210 applies mask processing to the signal subjected to the IFFT processing, and thereby extracts a correlation value of a section in which a correlation value of a desired cyclic shift sequence exists (window portion). Next, CH estimation section 210 applies DFT (Discrete Fourier Transform) processing to the extracted correlation value and outputs the correlation value subjected to the DFT processing to frequency domain equalization section 207 as a channel estimate value. Here, the outputted signal is a signal representing a frequency fluctuation of a propagation path (frequency response of a propagation path).

FFT section 205 on the data side applies FFT processing to the data signal inputted from demultiplexing section 204 to transform the data signal from a time domain signal into a frequency domain signal. FFT section 205 outputs the data signal transformed into the frequency domain signal to demapping section 206.

Demapping section 206 extracts a data signal of a portion corresponding to the transmission band of each terminal from the signal inputted from the FFT section and outputs each extracted signal to frequency domain equalization section 207.

Frequency domain equalization section 207 applies equalization processing to the data signal inputted from demapping section 206 using the signal inputted from CH estimation section 210 (frequency response of the propagation path) and outputs the signal subjected to the equalization processing to IDFT section 211.

IDFT section 211 applies IDFT processing to the data signal inputted from frequency domain equalization section 207 and transforms the frequency domain signal back into a time domain signal. IDFT section 211 outputs the time domain signal to demodulation section 212.

Demodulation section 212 applies demodulation processing to the signal inputted from the IDFT section and outputs the signal subjected to the demodulation processing to decoding section 213.

Decoding section 213 applies decoding processing to the signal inputted from demodulation section 212 and extracts received data.

[Calculation Processing on Sequence Numbers q and q']

Here, calculation processing on sequence numbers q and q' performed by sequence calculation section 112 of terminal 100 and the sequence calculation section of base station 200 will be described in detail.

Figure 12:
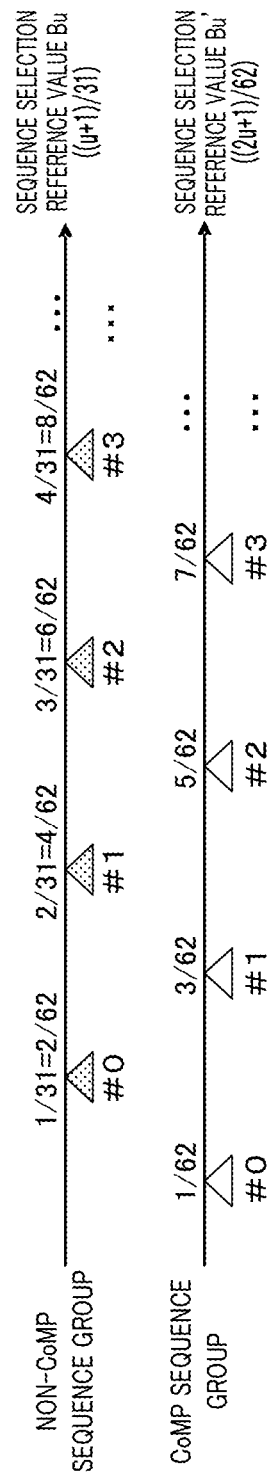
FIG. 12 illustrates selection reference values of a non-CoMP_UE sequence group and a CoMP_UE sequence group according to Embodiment 1.
Figure 13:
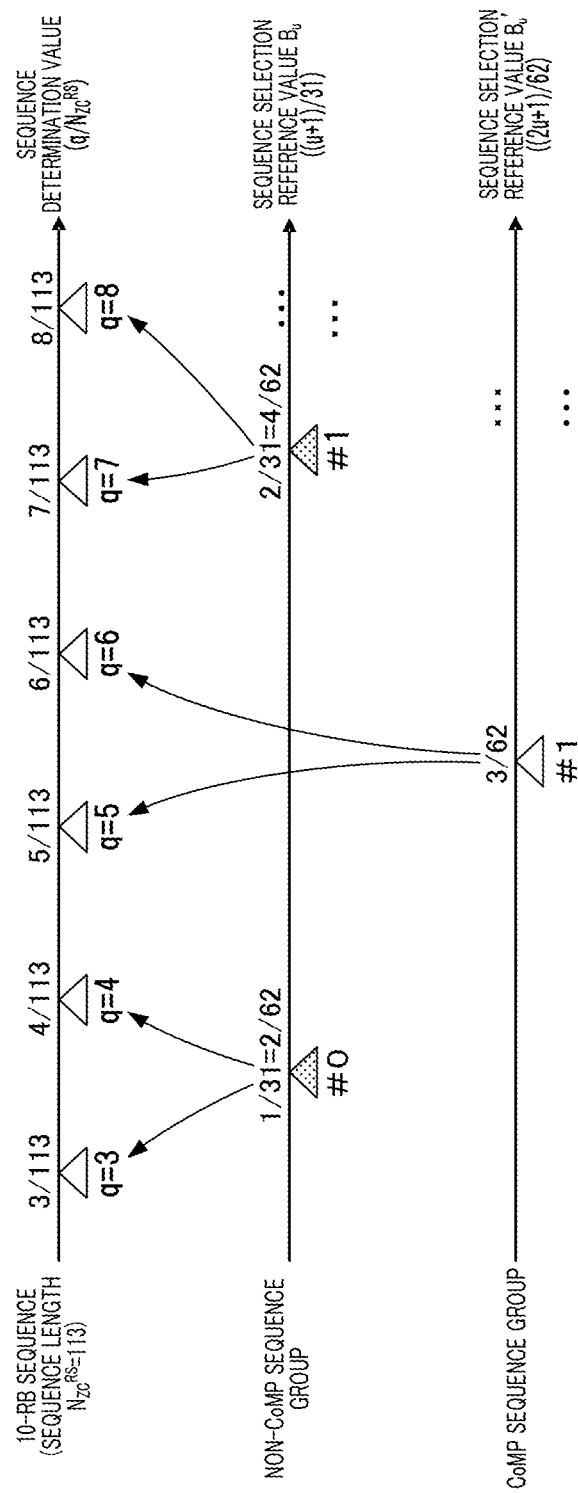
FIG. 13 illustrates a method of selecting a ZC sequence in the case of 10 RBs according to Embodiment 1.

FIG. 12 illustrates selection reference values of a non-CoMP_UE sequence group and a CoMP_UE sequence group according to Embodiment 1. FIG. 13 illustrates a method of selecting a ZC sequence in the case of 10 RBs according to Embodiment 1.

When terminal 100 is a non-CoMP_UE, sequence calculation section 112 of terminal 100 calculates non-CoMP_UE sequence selection reference value $B_u=(u+1)/31$ using sequence group number u as shown in equation 3 first. Here, a cell-specific sequence group number u (one of numbers 0 to 29) assigned to a serving cell is applied as the sequence group number u.

On the other hand, when terminal 100 is a CoMP_UE, sequence calculation section 112 of terminal 100 calculates CoMP_UE sequence selection reference value $B_u'$, which is different from any non-CoMP_UE sequence selection reference value $B_u$ using the sequence group number u as shown in equation 4. The explicitly or implicitly indicated UE-specific sequence group number u (e.g., one of numbers 0 to 29) is applied as the sequence group number u used here.

As shown in FIG. 12, a predetermined number of CoMP_UE sequence selection reference values $B_u'$ (e.g., one in the case of FIG. 12) are set between adjacent sequence selection reference values $B_u$ of the non-CoMP_UE sequence group. This CoMP_UE sequence selection reference value $B_u'$ corresponds to an intermediate sequence selection reference value. Equation 4 is a calculation expression when one CoMP_UE sequence selection reference value $B_u'$ is set between adjacent sequence selection reference values $B_u$ of the non-CoMP_UE sequence group.

Next, sequence calculation section 112 of terminal 100 calculates sequence number q corresponding to sequence length $N_{ZC}^{RS}$ based on non-CoMP_UE sequence selection reference value $B_u$ or CoMP_UE sequence selection reference value $B_u'$. FIG. 13 schematically illustrates this calculation processing.

Although only some of numerical value intervals are shown in FIG. 13, in the case of a sequence for 10 RBs (sequence length $N_{ZC}^{RS}=113$), a number of sequence determination values "$q/N_{ZC}^{RS}$ (or $q'/N_{ZC}^{RS}$)=1/113 to 112/113" corresponding to the sequence length uniformly appear in the numerical value interval of "0 to 1." In addition, 30 non-CoMP_UE sequence selection reference values "$B_u=1/31$ to 30/31" and 30 CoMP_UE sequence selection reference values "$B_u'=1/62, 3/62, 5/62, \ldots, 61/62$" are set in this numerical value section. The numerical value section between sequence selection reference value $B_u$ of the non-CoMP_UE sequence group (interval of #0 to 1 in the case of FIG. 13) corresponds to a sequence selection numerical value interval.

When terminal 100 is a non-CoMP_UE, sequence calculation section 112 of terminal 100 calculates non-CoMP_UE ZC sequence number q using previously calculated sequence selection reference value $B_u$ as shown in equation 5-1.

Equation 5-1 corresponds to calculating a ZC sequence number (when v=0) and a ZC sequence number (when v=1) where the absolute value of the difference between the sequence determination value ($q/N_{ZC}^{RS}$) and non-CoMP_UE sequence selection reference value $B_u$ is closest to 0 and second closest to 0, respectively.

Here, for example, let us suppose that the transmission bandwidth is 10 RBs and non-CoMP_UE sequence selection reference value $B_u$ is "1/31." In this case, as shown in FIG. 13, ZC sequence numbers "q=3 and 4" are calculated so that two sequence determination values "$q/N_{ZC}^{RS}=3/113$ and 4/113" closest to non-CoMP_UE sequence selection reference values "$B_u=1/31$" are selected. Moreover, if non-CoMP_UE sequence selection reference value $B_u$ is "2/31," ZC sequence numbers "q=7 an 8" are calculated so that two sequence determination values "$q/N_{ZC}^{RS}=7/113$ and 8/113" closest to this sequence selection reference value $B_u$ are selected.

On the other hand, when terminal 100 is a CoMP_UE, sequence calculation section 112 of terminal 100 calculates CoMP_UE ZC sequence number q' using previously calculated CoMP_UE sequence selection reference value $B_u'$ as shown in equation 5-2.

Equation 5-2 corresponds to calculating a ZC sequence number (when v=0) and ZC sequence number (when v=1) where the absolute value of the difference between sequence determination value (q'/$N_{ZC}^{RS}$) and CoMP_UE sequence selection reference value $B_u'$ is closest to 0 and second closest to 0 respectively.

Here, for example, let us suppose that the transmission bandwidth is 10 RBs and CoMP_UE sequence selection reference value $B_u'$ is "3/62." In this case, as shown in FIG. 13, ZC sequence numbers "q'=5 and 6" are calculated so that two sequence determination values "q'/$N_{ZC}^{RS}$=5/113 and 6/113" closest to CoMP_UE sequence selection reference value "$B_u'$=3/62" are selected.

[3]

$$B_u = \frac{u+1}{31}, (u = 0, \ldots, 29) \quad \text{(Equation 3)}$$

$$B_u' = \frac{u}{31} + \frac{1}{62} = \frac{2u+1}{62}, (u = 0, \ldots, 29) \quad \text{(Equation 4)}$$

$$q = \lfloor \bar{q} + 1/2 \rfloor + v \cdot (-1)^{\lfloor 2\bar{q} \rfloor} \quad \text{(Equation 5-1)}$$
$$\bar{q} = N_{ZC}^{RS} \cdot B_u$$

$$q' = \lfloor \bar{q}' + 1/2 \rfloor + v \cdot (-1)^{\lfloor 2\bar{q}' \rfloor} \quad \text{(Equation 5-2)}$$
$$\bar{q}' = N_{ZC}^{RS} \cdot B_u'$$

Thus, in the present embodiment, different values are used as reference values to select a sequence for non-CoMP_UE sequence selection reference value $B_u$ and CoMP_UE sequence selection reference value $B_u'$. Thus, it is possible to generate, for CoMP_UE, a ZC sequence of the ZC sequence group having a correlation characteristic different from the conventional 30 non-CoMP_UE sequence groups. Using such a ZC sequence prevents a sequence having a high cross-correlation from being used in a nearby cell, and can thereby reduce inter-cell interference.

In the present embodiment, as CoMP_UE sequence selection reference values $B_u'$, such values are adopted that sequence selection reference values $B_u$ and $B_u'$ are deployed at uniform intervals between two adjacent non-CoMP_UE sequence selection reference values $B_u$. Therefore, when a sequence determination value (ratio between a ZC sequence number and a sequence length) is selected based on these sequence selection reference values $B_u$ and $B_u'$, it is possible to space the differences in sequence determination values among a plurality of sequence groups substantially uniformly.

As described above, a cross-correlation value between different ZC sequences increases as the ratios between a ZC sequence number and a sequence length are closer to each other (see NPL 1). Conversely, the cross-correlation value decreases as the ratios between a ZC sequence number and a sequence length are more distant from each other. Thus, by generating sequence groups as described above, it is possible to avoid increases in inter-cell interference of DMRS used for non-CoMP_UE and CoMP_UE.

The sequence calculation section of base station 200 calculates CoMP_UE sequence number q and non-CoMP_UE sequence number q' through the same processing as that described above based on whether terminal 100 as the communicating party is a CoMP_UE or non-CoMP_UE.

Note that similar effects can also be achieved using equation 4' instead of equation 4.

[4]

$$B_u' = \frac{u+1}{31} + \frac{1}{62} = \frac{2u+3}{62}, (u = 0, \ldots, 29) \quad \text{(Equation 4)'}$$

CoMP_UE sequence selection reference value $B_u'$ in equation 4 corresponds to 30 new sequence selection reference values obtained by shifting 30 non-CoMP_UE sequence selection reference value $B_u$ by 1/62 to the negative side. In contrast, CoMP_UE sequence selection reference value $B_u'$ of equation 4' corresponds to 30 new sequence selection reference values obtained by shifting 30 non-CoMP_UE sequence selection reference value $B_u$ by 1/62 to the positive side.

In the example of FIG. 12, one CoMP_UE sequence selection reference value $B_u'$ is provided between adjacent non-CoMP_UE sequence selection reference values $B_u$, but a plurality of (such as two or three) CoMP_UE sequence selection reference values $B_u'$ may be provided to set more CoMP_UE sequence selection reference values $B_u'$. This makes it possible to generate more CoMP_UE sequence groups than non-CoMP_UE sequence groups. Next, an example of this case will be described.

Figure 14:
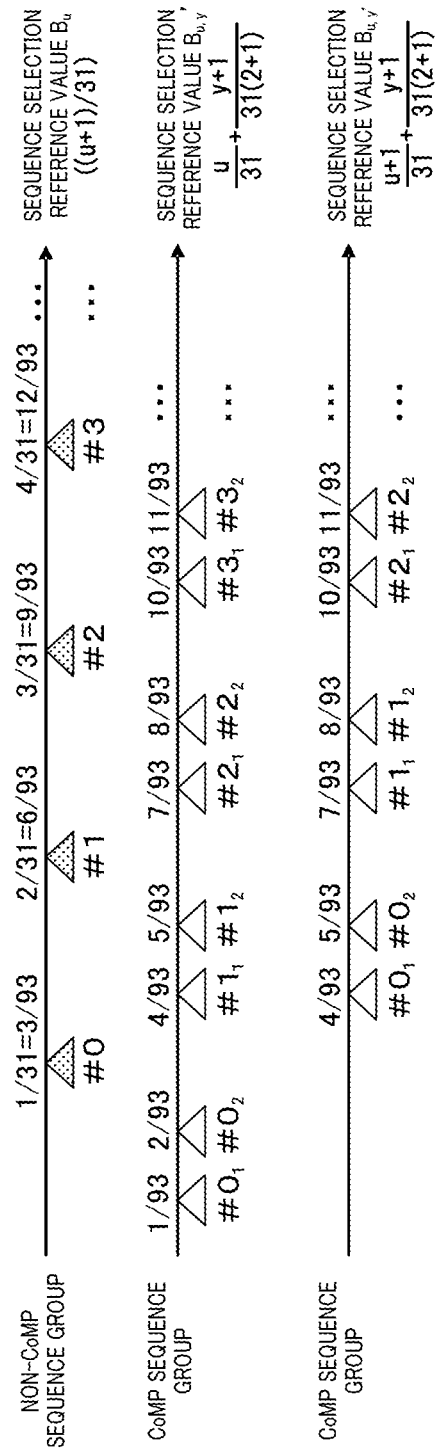
FIG. 14 illustrates a variation of selection reference values of a CoMP_UE sequence group according to Embodiment 1.

FIG. 14 illustrates a modification of selection reference values of CoMP_UE sequence groups.

A case will be described here where Y (Y corresponds to the number of divisions of a reference value to select a sequence) CoMP_UE sequence groups are generated between non-CoMP_UE sequence selection reference values (equation 3). In this case, Y CoMP_UE sequence selection reference values $B_{u,y}'$ of CoMP_UE sequence group (u, y) (where, y=0, . . . ,Y−1) are set between adjacent sequence selection reference values $B_u$ of the non-CoMP_UE sequence group. More specifically, sequence selection reference values $B_{u,y}'$ of the CoMP_UE sequence group (u, y) are calculated according to equation 6 or equation 6'. Equations 4 and 4' are equivalent to equations 6 and 6' when Y=1. The example of FIG. 14 illustrates selection reference values of a sequence group when Y=2.

[5]

$$B_{u,y}' = \frac{u}{31} + \frac{y+1}{31 \cdot (Y+1)}, \quad \text{(Equation 6)}$$
$$(u = 0, \ldots, 29; y = 0, \ldots (Y-1))$$

$$B_{u,y}' = \frac{u+1}{31} + \frac{y+1}{31 \cdot (Y+1)}, \quad \text{(Equation 6)'}$$
$$(u = 0, \ldots, 29; y = 0, \ldots (Y-1))$$

By generating a CoMP_UE sequence group in this way, it is possible to uniformly space the ratios between a ZC sequence number and a sequence length between CoMP_UE and non-CoMP_UE sequence groups, and thereby reduce inter-cell interference.

A configuration has been described above as an example where CoMP_UE sequence selection reference values $B_u'$ and $B_{u,y}'$ are set between two adjacent non-CoMP_UE sequence selection reference values $B_u$ at uniform intervals. However, CoMP_UE sequence selection reference values $B_u'$ and $B_{u,y}'$ may also be set to values slightly different from the values set at the above-described uniform intervals. Although they are set to slightly different values, it is possible to assign sequence groups just as in the case where the values are set at uniform intervals.

When fewer CoMP_UE sequence groups than non-CoMP_UE sequence groups are generated, a maximum number of CoMP_UE sequence group number u may be limited using the same equation.

As described above, according to present Embodiment 1, sequences with ratios between a ZC sequence number and a ZC sequence length (different correlation characteristics) different from those of non-CoMP_UE DMRS ZC sequences are used as CoMP_UE DMRS ZC sequences. Therefore, a reuse distance which is a distance between two cells in which the same sequence group is used will not decrease. It is thereby possible to prevent inter-cell interference of DMRS used for CoMP_UE and non-CoMP_UE from increasing.

Embodiment 2

[Additional Problems]

When the ZC sequence selection method described in Embodiment 1 is applied as is to a case where a transmission bandwidth is 5 RBs or less, there is a problem that CoMP_UE ZC sequences that will satisfy desired conditions cannot be secured sufficiently.

For example, when the transmission bandwidth is 3 RBs ($M^{RS}$=36 subcarriers), since ZC sequence length $N_{ZC}^{RS}$ is a maximum prime number in units of the numbers of subcarriers smaller than transmission bandwidth $M^{RS}$, $N_{ZC}^{RS}$=31. There are ($N_{ZC}^{RS}$−1) ZC sequences with ZC sequence numbers q=1 to ($N_{ZC}^{RS}$−1). In this case, it is therefore not possible to select any sequence number which is closest to sequence selection reference value $B_u'$ of equation 4 and different from the non-CoMP_UE ZC sequence as the CoMP_UE ZC sequence.

When the transmission bandwidth is 4 RBs and 5 RBs, ZC sequence length $N_{ZC}^{RS}$ becomes 47 and 59, respectively. Thus, it is not possible to select sequence numbers different from non-CoMP_UE ZC sequences of 30 sequence groups one by one as CoMP_UE ZC sequences of 30 sequence groups in this case, either.

FIGS. 15A and 15B illustrate results of cases where the ZC sequence selection method of Embodiment 1 is applied to 3 RBs to 6 RBs. FIG. 15A illustrates each ZC sequence number q assigned to each non-CoMP_UE ZC sequence group (u=0 to 29) calculated based on the sequence selection reference values of equation 3 (where, the transmission bandwidth is 3 to 6 RBs). On the other hand, FIG. 15B illustrates ZC sequence number q' assigned to each CoMP_UE ZC sequence group (u=0 to 29) calculated with the sequence selection reference values in equation 4 (where, the transmission bandwidth is 3 to 6 RBs).

It can be confirmed in FIG. 15B that ZC sequence numbers in the shaded area are the same for non-CoMP_UE and CoMP_UE. Using ZC sequences whose ZC sequence length and ZC sequence number are the same for non-CoMP_UE and CoMP_UE in this way may cause inter-cell interference of DMRS to increase between non-CoMP_UE and CoMP_UE.

[Configurations of Terminal 100 and Base Station 200]

The configuration of terminal 100 according to Embodiment 2 is substantially the same as that of Embodiment 1 and is only different in operations of sequence calculation section 112 and reference signal generating section 113 in a case where the transmission bandwidth is equal to or below a predetermined value (e.g., 5 RBs or less). As in the case of terminal 100, the configuration of base station 200 of Embodiment 2 is only different in the operations of the sequence calculation section and the reference signal generating section included in reference signal setting section 214 in a case where the transmission bandwidth is equal to or below a predetermined value (e.g., 5 RBs or less).

Operation of Embodiment 2

Here, the operation of sequence calculation section 112 and reference signal generating section 113 of terminal 100 will be described. Reference signal setting section 214 of base station 200 performs substantially the same processing, and therefore description thereof will be omitted.

First, sequence calculation section 112 determines whether the transmission bandwidth of DMRS (=$M^{RS}$ [subcarriers]) indicated from base station 200 is equal to or below a predetermined value (e.g., 5 RBs or less) and whether the output from CoMP determining section 111 is CoMP_UE or not. When the determination result is affirmative, sequence calculation section 112 sets a value greater than transmission bandwidth $M^{RS}$ as ZC sequence length $N_{ZC}^{RS}$.

Here, sequence calculation section 112 sets, for example, a maximum prime number which does not exceed twice the transmission bandwidth as ZC sequence length $N_{ZC}^{RS}$. That is, in the cases of 3, 4 and 5 RBs, ZC sequence length $N_{ZC}^{RS}$ is assumed to be 71, 89 and 113, respectively. This makes it possible to increase the number of ZC sequences (=$N_{ZC}^{RS}$−1) that can be generated.

Next, sequence calculation section 112 calculates CoMP_UE ZC sequence number q' using equation 5-2 based on CoMP_UE ZC sequence length $N_{ZC}^{RS}$ calculated as described above and CoMP_UE sequence selection reference value $B_u'$ (e.g., equation 4) shown in Embodiment 1.

FIG. 16 is a table illustrating ZC sequence selection results of Embodiment 2 in the cases of 3 RBs to 6 RBs. The table in FIG. 16 shows ZC sequence length $N_{ZC}^{RS}$ calculated when the transmission bandwidth is 3 to 6 RBs and ZC sequence number q' assigned to each CoMP_UE ZC sequence group (u=0 to 29).

With ZC sequence number q' calculated as shown in FIG. 16, compared to the non-CoMP_UE sequence group in FIG. 15A, it is possible to make different a sequence determination value (ratio between a ZC sequence length and a ZC sequence number) in any sequence group. Thus, using this ZC sequence number q' makes it possible to avoid increases in inter-cell interference of DMRS used for non-CoMP_UE and CoMP_UE.

Note that setting values of the ZC sequence length set by sequence calculation section 112 with a transmission bandwidth equal to or below a predetermined value are not limited to the case where they are calculated from twice the transmission bandwidth. If the setting value of the ZC sequence length is assumed to be a prime number twice or more than the transmission bandwidth, it is possible to select one or more sequence numbers closest to sequence selection reference value $B_u'$ in equation 4 and different from non-CoMP_UE ZC sequences as CoMP_UE ZC sequences. Therefore, sequence calculation section 112 and reference signal generating section 113 may be configured to set a ZC sequence length corresponding, for example, a system bandwidth and use a ZC sequence, part of which is removed.

Reference signal generating section 113 deletes part of the ZC sequence having ZC sequence length $N_{ZC}^{RS}$, generates a reference signal sequence having a length of transmission bandwidth $M^{RS}$ and outputs the reference signal sequence to mapping section 102.

Figure 17:
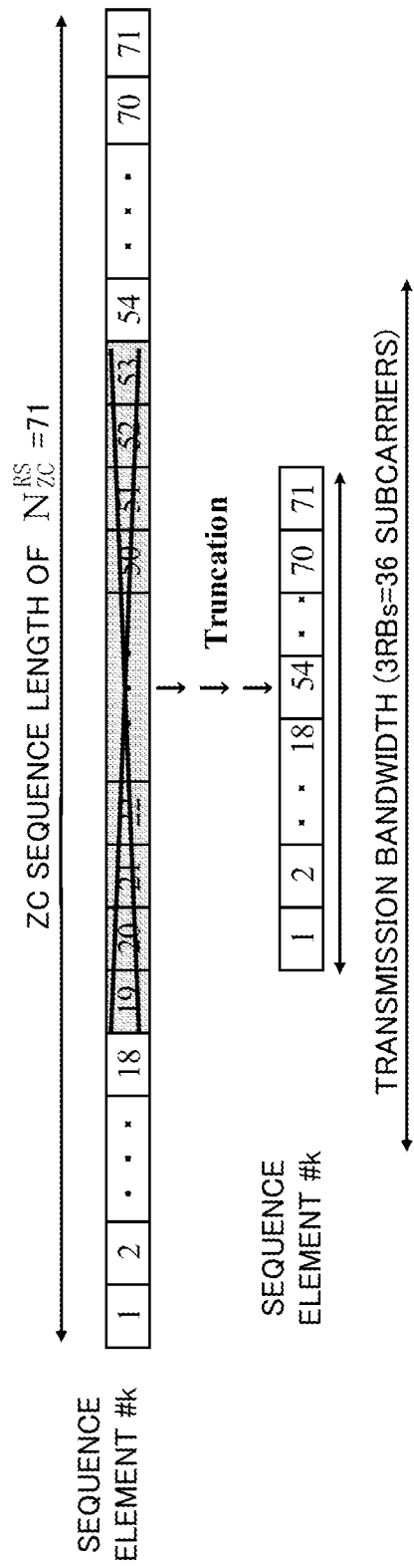
FIG. 17 illustrates a first example of truncation processing on a ZC sequence according to Embodiment 2.
Figure 18:
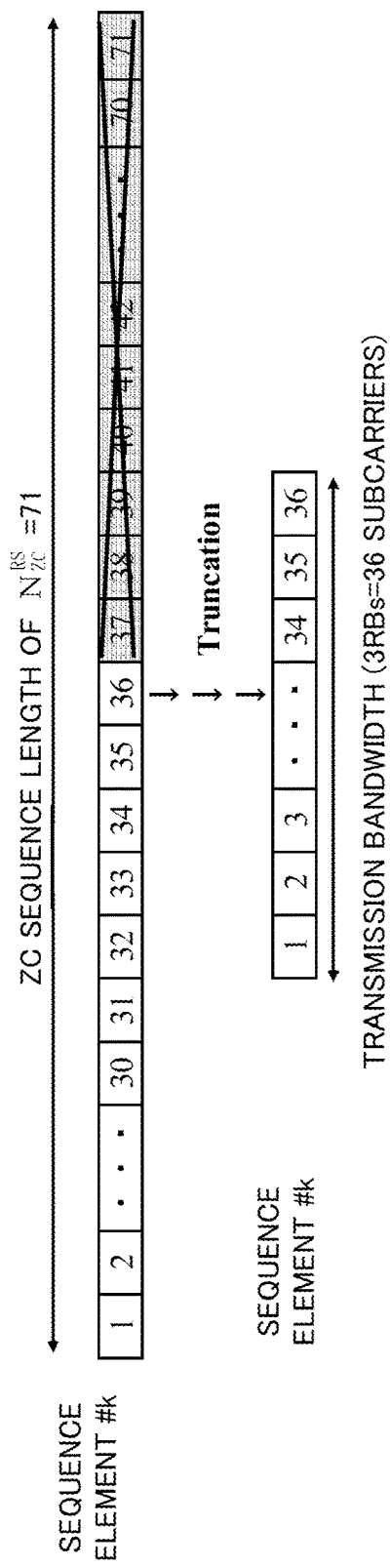
FIG. 18 illustrates a second example of truncation processing on a ZC sequence according to Embodiment 2.

FIG. 17 illustrates a first example of truncation processing on a ZC sequence according to Embodiment 2 and FIG. 18 illustrates a second example of truncation processing on a ZC sequence according to Embodiment 2.

Reference signal generating section 113 deletes part of the ZC sequence taking advantage of symmetry of the waveform thereof as follows. Two examples will be described below. Since the waveform of the ZC sequence has symmetry (waveform, the left and right sides of which are symmetric with respect to the central axis), the first example is a method that deletes part of the ZC sequence so as to maintain this symmetry. This makes it possible to avoid increases in cross-correlation (see WO2009/041066). To be more specific, as shown in FIG. 17, symmetry of the waveform can be maintained by deleting the central part of the waveform of the ZC sequence (waveform shown in the upper row in FIG. 17 assuming sequence element #k) and merging the left and right waveforms.

The second example is a method that deletes the first half or last half of the waveform of the ZC sequence as shown in FIG. 18. Since the ZC sequence has symmetric nature, the first half and the last half of the waveform have fluctuations at the same level, and it is thereby possible to avoid increases in PAPR (Peak to Average Power Ratio) and CM (Cubic Metric).

When the transmission bandwidth of DMRS (=$M^{RS}$ [subcarriers]) indicated from base station 200 is greater than a predetermined value (e.g., 6 RBs or more) or when the output from the CoMP determining section is non-CoMP_UE, the operation is similar to that of Embodiment 1. That is, sequence calculation section 112 and reference signal generating section 113 perform the same operation as that of Embodiment 1 in this case.

As described above, according to Embodiment 2, even when the transmission bandwidth is narrow, it is possible to assign a plurality of sequence groups which are closest to CoMP_UE sequence selection reference values $B_u'$ and sequence determination value $q/N_{ZC}^{RS}$ of which is different from the non-CoMP_UE value. Thus, Embodiment 2 as well as Embodiment 1 can avoid increases in inter-cell interference of DMRS used for CoMP_UE and non-CoMP_UE. Furthermore, Embodiment 2 deletes part of the ZC sequence taking advantage of symmetry of the waveform of the ZC sequence to generate DMRS, and can thereby avoid cross-correlation of DMRS used for CoMP_UE and increases in PAPR or CM.

Embodiment 3

[Other Problems]

As described in PTL 1, while a cross-correlation between ZC sequences having similar ratios (sequence determination values) between a ZC sequence number and a ZC sequence length is highest, a cross-correlation between ZC sequences whose difference in sequence determination values is close to 0.5 is second highest. According to the ZC sequence selection method of Embodiment 1, for example, sequence selection reference value $B_0$ corresponding to non-CoMP_UE sequence group number u=1 becomes $B_0$=2/31 from equation 3. On the other hand, sequence selection reference value $B_{17}'$ corresponding to CoMP_UE sequence group number u=17 becomes $B_{17}'$=35/62 from equation 4, and the relationship between the two becomes $B_{17}'$=$B_0$+1/2. Therefore, when ZC sequences with two sequence determination values close to these sequence selection reference values $B_0$ and $B_{17}'$ are selected, the cross-correlation between these ZC sequences increases. When these ZC sequences are used in a neighboring cell in the same frequency band, inter-cell interference of DMRS gradually increases. Embodiment 3 is intended to avoid such increases in inter-cell interference.

[Configurations of Terminal 100 and Base Station 200]

The configurations of terminal 100 and base station 200 according to Embodiment 3 are substantially the same as those of Embodiment 1 and only operations of sequence calculation section 112 and the sequence calculation section of base station 200 are different.

Operation of Embodiment 3

Next, the operation of sequence calculation section 112 of terminal 100 will be described. Since the sequence calculation section of base station 200 performs substantially the same operation, and therefore description thereof will be omitted.

Sequence calculation section 112 of Embodiment 3 is different from Embodiment 1 in the method of setting CoMP_UE UE-specific sequence group number u.

Upon receiving indication of CoMP_UE UE-specific sequence group number u from base station 200, sequence calculation section 112 uses that sequence group number u.

On the other hand, upon receiving no implicit or explicit indication of UE-specific sequence group number u from base station 200, sequence calculation section 112 derives CoMP_UE UE-specific sequence group number u from the non-CoMP_UE sequence group number according to predetermined rules. Two specific derivation methods will be described below.

Figure 19:
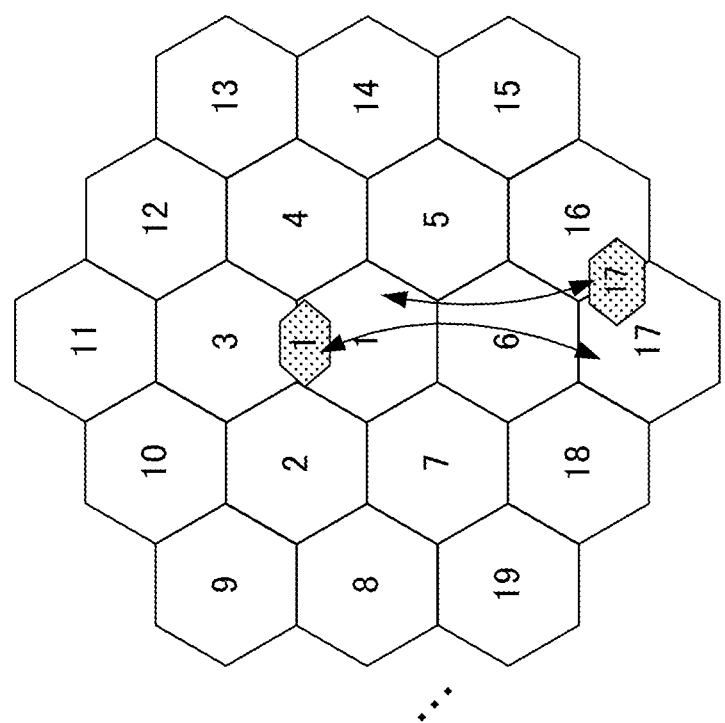
FIG. 19 illustrates a method of deriving a CoMP_UE sequence group according to Embodiment 3.

FIG. 19 illustrates a first example of the method of assigning a CoMP_UE sequence group according to Embodiment 3.

The first method is a method whereby UE-specific sequence group number u is selected so that CoMP_UE sequence selection reference value $B_u'$ becomes closest to non-CoMP_UE sequence selection reference value $B_u$.

In this method, for example, when the number of CoMP_UE sequence groups is 30 (the same as the number of non-CoMP_UE sequence groups, the number of divisions of sequence selection reference value Y=1), CoMP_UE UE-specific sequence group numbers may be calculated as shown in equation 7. It is thereby possible to separate cells using sequence groups having a slightly high cross-correlation corresponding to a difference in sequence selection references of 0.5 as shown in FIG. 19 (e.g., non-CoMP_UE sequence group number #1 and CoMP_UE sequence group number #17). According to this method, it is possible to reduce interference between DMRSs used for CoMP_UE and non-CoMP_UE through distance attenuation.

(Equation 7)

CoMP_UE sequence group number=Non-CoMP_UE sequence group number　　　[6]

The following effects can be achieved by applying the above-described method of deriving UE-specific sequence group number u. For example, as shown in FIG. 19, let us suppose a case where a CoMP_UE sequence group number is assigned to CoMP_UE located in the vicinity of a boundary between two cells to which non-CoMP_UE sequence group numbers #1 and #3 are assigned. In this case, when CoMP_UE belongs to a cell to which non-CoMP_UE sequence group number #1 is assigned (when the serving cell is #1), the base station need not notify this CoMP_UE of the CoMP_UE sequence group number. For this CoMP_UE, a sequence group number may be derived using the above-described method. Furthermore, let us suppose that this CoMP_UE has moved to a cell to which non-CoMP_UE sequence group number #3 is assigned (when the serving cell is #3). The base station needs to indicate CoMP_UE sequence group number #17 to CoMP_UE only in this case. Thus, indication of a CoMP_UE sequence group number can be omitted in one of two cells.

Figure 20:
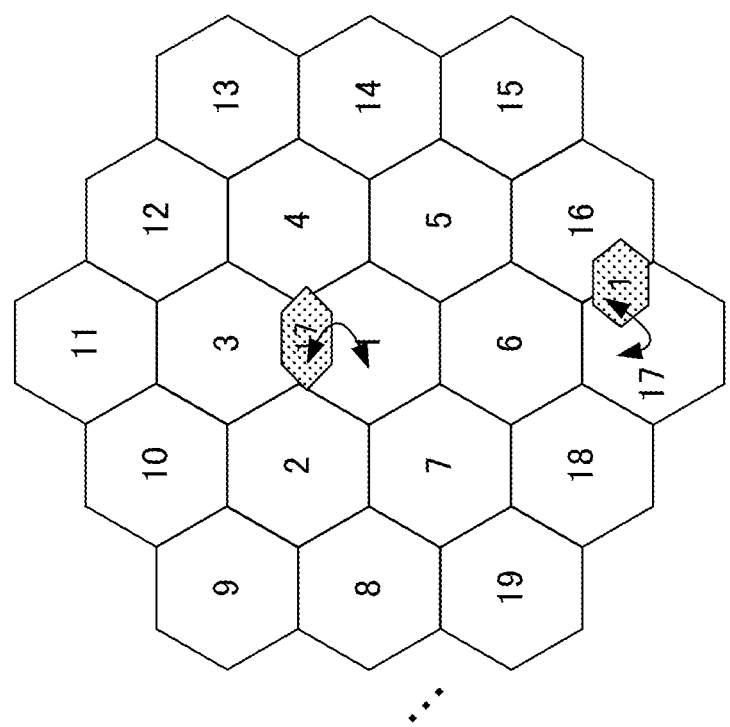
FIG. 20 illustrates another example of the method of deriving a CoMP_UE sequence group according to Embodiment 3.

FIG. 20 illustrates a second example of the method of assigning CoMP_UE sequence groups according to Embodiment 3.

The second method is a method whereby UE-specific sequence group number u is selected so that CoMP_UE sequence selection reference value $B_u'$ becomes closest to non-CoMP_UE sequence selection reference value $B_u+0.5$.

According to this method, for example, when the number of CoMP_UE sequence groups is 30 (the same as the number of non-CoMP_UE sequence groups, the number of divisions of the sequence selection reference value Y=1), the CoMP_UE UE-specific sequence group number may be calculated as shown in equation 8. Thus, as shown in FIG. 20, sequence groups having a slightly high cross-correlation corresponding to a difference in sequence selection references of 0.5 (e.g., non-CoMP_UE sequence group number #1 and CoMP_UE sequence group number #17) can be used in cells in the same CoMP reception area. Since one scheduler allocates resources in a cell in the CoMP reception area, the scheduler can assign UEs whose interference increases to different frequency bands. Thus, it is possible to reduce interference of DMRS used for CoMP_UE and non-CoMP_UE by allocating appropriate resources.

(Equation 8)

CoMP_UE sequence group number=(Non-CoMP sequence group number+16)mod(30) [7]

Even in a case where such a method of deriving UE-specific sequence group number u is applied, if CoMP_UE is located in the vicinity of a boundary between two cells as shown in FIG. 20, an effect can be achieved that indication of CoMP_UE sequence group numbers can be omitted for one of the two. That is, the base station needs to indicate, only to CoMP_UE whose non-CoMP_UE sequence group number is #3 (UE whose serving cell is #1), the CoMP_UE sequence group number. It is possible to omit indication of CoMP_UE sequence group numbers to CoMP_UE (UE whose serving cell is #1) whose non-CoMP_UE sequence group number is #1.

As described above, according to Embodiment 3, it is possible to reduce interference between DMRSs used for CoMP_UE and non-CoMP_UE by taking into account the assignment of sequence groups having a slightly high cross-correlation between CoMP_UE and non-CoMP_UE corresponding to a difference in sequence determination value of 0.5.

Moreover, according to Embodiment 3, it is possible to reduce the amount of signaling of UE-specific sequence group numbers by determining beforehand the method of deriving CoMP_UE sequence group numbers when there is no notification thereof.

The embodiments of the present invention have been described so far.

Although in the above-described embodiments, a terminal whose transmission signals are received and combined by a plurality of cells in cooperation is represented by CoMP_UE, CoMP_UE may be read as a UE in which a UE-specific DMRS sequence is settable or set. Alternatively, CoMP_UE may be read as a UE that supports 3GPP Rel. 11 or later or a UE in which Virtual_cell_ID is settable or set. In addition, CoMP_UE may be read as a UE to which a base station has explicitly indicated that it is CoMP_UE or a UE instructed to use a ZC sequence which is different from a sequence of cell-specific assignment for DMRS.

CoMP_UE may also be represented by a UE which supports Rel. 11 or later and which is connected to a low transmission power base station (pico cell, RRH (Remote Radio Head) or the like).

Here, a case will be described where the present invention is applied to a system in which a low transmission power base station is disposed.

Figure 21:
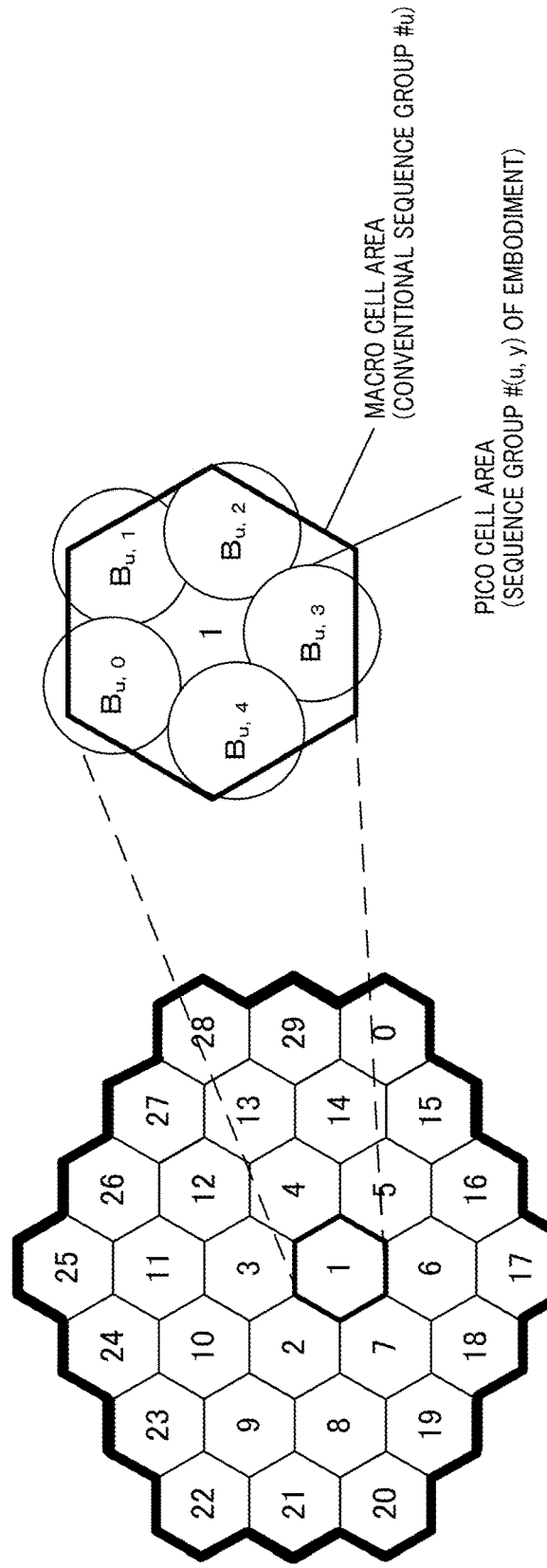
FIG. 21 illustrates an example in which sequence group assignment according to the present invention is applied to a system including a low power base station.

FIG. 21 illustrates an example in which sequence group assignment according to the present invention is applied to a system provided with a low power base station.

For example, in LTE Rel. 11 or later, as shown in FIG. 21, a macro cell area in which sequence groups defined in LTE Rel. 10 are used may be covered with a plurality of newly arranged low transmission power base stations. When such a plurality of low transmission power base stations are deployed, the cell radius of each base station becomes smaller, and a reuse distance of sequence groups (distance between cells using the same sequence group) becomes smaller, resulting in a similar problem that inter-cell interference increases.

Thus, by assigning a new sequence group described in the above-described embodiments as a CoMP_UE sequence group to a newly installed low transmission power base station, it is possible to achieve effects similar to those of the above-described embodiments. That is, the present embodiment is applied by assuming a UE to be connected to the newly installed low transmission power base station as a CoMP_UE and UEs to be connected to other cells as non-CoMP_UEs according to LTE Rel. 11 or later. More specifically, as shown in FIG. 21, a case is assumed where a sequence group number used by a UE (non-CoMP_UE) connected to a macro cell is #1 and five small cells (also referred to as "pico cells") of LTE Rel. 11 or later are deployed in the cell area. In this case, five sequence groups are generated using five CoMP_UE sequence selection reference values $B_{u,y}'$ ($B_{u,0}'$ to $B_{u,4}'$) calculated by equation 9) by assuming Y=5 in equation 6 and assigned to the respective small cells. This makes it possible to reduce interference between DMRSs of UEs connected to different cells (between small cells or between small cell and macro cell).

[8]

$$B'_{u,y} = \frac{u}{31} + \frac{y+1}{31 \cdot 6}(u = 0, \ldots, 29; y = 0, \ldots, 4) \quad \text{(Equation 9)}$$

The above-described embodiments have described that CoMP_UE is indicated from a base station to a terminal, and more specifically, UL Grant (UpLink Grant) of PDCCH (Physical Downlink Control Channel) can be applied as resources and control information used for this indication. In addition, RRC (Radio Resource Control) signaling (higher layer signaling) is also applicable as control information used for this indication.

Although a case has been described in the above-described embodiments as an example of configuration in which reference signal sequences according to the present invention are applied to DMRS, a configuration may also be adopted in which reference signal sequences according to the present invention are applied to SRS (Sounding Reference Signal).

Moreover, the above-described embodiments have mainly described the configuration in which the number of ZC sequences usable for each RB of a CoMP_UE sequence group is equal to the number of non-CoMP_UE sequence groups. However, the number of ZC sequences usable for each RB of a CoMP_UE sequence group may be different from the number of non-CoMP_UE sequence groups. For example, as shown in FIG. 1, the number of non-CoMP_UE sequence groups is 1 sequence for 3 to 5 RBs and 2 sequences for 6 RBs or more. On the other hand, the number of CoMP_UE sequence groups may be 1 sequence for all RBs as shown in FIG. 22. FIG. 22 is a table illustrating a variation of the method of assigning CoMP_UE ZC sequences.

Narrowing down CoMP_UE ZC sequences to 1 sequence for each RB in this way can achieve the following effects. That is, DMRS of CoMP_UE requires higher channel estimation accuracy for MU-MIMO separation. Thus, narrowing down CoMP_UE ZC sequences to 1 sequence for each RB makes it possible to use only ZC sequences with a sequence determination value (ratio between a ZC sequence number and ZC sequence length) closer to desired sequence selection reference $S_n'$ as DMRS. This reduces inter-cell interference of DMRS, and can thereby improve channel estimation accuracy.

[Exception Handling]

As exception handling, the communication system according to the above-described embodiment may be configured to allow CoMP_UE to selectively use DMRS of a non-CoMP_UE sequence group and DMRS of a CoMP_UE sequence group in accordance with the situation.

For example, DMRS for RACH message 3 (RACH (Random Access Channel) response) may use non-CoMP_UE ZC sequences regardless of CoMP_UE or non-CoMP_UE. The base station cannot distinguish whether or not a terminal that transmits RACH message 3 is a UE in which cell-specific sequences can be set. Thus, by adopting such exception handling, the base station can receive RACH message 3 of CoMP_UE correctly.

When a sequence group number is explicitly indicated by RRC (Radio Resource Control) signaling, CoMP_UE may be configured so as to use non-CoMP_UE ZC sequences for a predetermined period immediately after signaling. The base station cannot determinately recognize whether or not the terminal is updated based on the signaling content from the base station for the predetermined period after signaling. Thus, by adopting such exception handling, the base station can receive an uplink signal correctly even for an indeterminate period immediately after signaling.

In each embodiment described above, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology, for example.

The disclosure of the specification, drawings, and abstract included in Japanese Patent Application No. 2012-052854 filed on Mar. 9, 2012 is incorporated herein by reference in its entirety.

INDUSTRIAL APPLICABILITY

The present invention is useful in mobile communication systems.

REFERENCE SIGNS LIST

100 Terminal
101 Antenna
102 Mapping section
103 IFFT section
104 CP adding section
105 Transmitting section
106 Receiving section
107 Demodulation section
108 Transmission processing section
109 Reception processing section
110 Reference signal processing section
111 CoMP determining section
112 Sequence calculation section
113 Reference signal generating section
200 Base station
201 Antenna
202 Receiving section
203 CP removing section
204 Demultiplexing section
205, 208 FFT section
206, 209 Demapping section
207 Frequency domain equalization section
210 CH estimation section
211 IDFT section
212 Demodulation section
213 Decoding section
214 Reference signal setting section
215 Modulation section
216 Transmitting section
217 Transmission processing section
218 Reception processing section

The invention claimed is:

1. A terminal, comprising:
   circuitry, which, in operation:
      determines a reference signal sequence number derived from a sequence length and a first selection reference value that is different from a second selection reference value $(u+1)/31$ used in a 3GPP release 10 or earlier, the first selection reference value being obtained from a sequence group number u assigned to the terminal according to a cell ID that is different from the first and second selection reference values, the determined reference signal sequence number being a sequence number q that makes an absolute value of a difference between the first selection reference value and q/N one of two lowest absolute values, where N is the sequence length; and generates a reference signal based on the determined reference signal sequence number; and a transmitter, which, in operation, transmits the generated reference signal, wherein the first selection reference value is a ratio between a value based on the sequence group number and a minimum sequence length, the minimum sequence length being a maximum prime numerical value that does not exceed a number of subcarriers included in a minimum transmission bandwidth of transmission bandwidths available in the sequence group number.

2. The terminal according to claim 1, wherein the first selection reference value is a ratio between a value based on the sequence group number and a minimum sequence length of sequence lengths available in the sequence group number.

3. The terminal according to claim 1, wherein the second selection reference value is one of a plurality of second selection reference values, and a difference between the first selection reference value and a second selection reference value that is closest to the first selection reference value is different from a difference between the closest two second selection reference values of the plurality of second selection reference values.

4. The terminal according to claim 1, wherein the second selection reference value is one of a plurality of second selection reference values, and a difference between the first selection reference value and a second selection reference value that is closest to the first selection reference value is smaller than a difference between the closest two second selection reference values of the plurality of second selection reference values.

5. The terminal according to claim 1, wherein the second selection reference value is one of a plurality of second selection reference values, and the first selection reference value is numerically between the closest two second selection reference values of the plurality of second selection reference values.

6. The terminal according to claim 1, wherein the reference signal sequence number is a sequence number of a Zadoff-Chu sequence.

7. The terminal according to claim 1, wherein the first selection reference value is a ratio between u+1 and a minimum sequence length of sequence lengths available in the sequence group number.

8. A method, comprising:
determining, by a terminal, a reference signal sequence number derived from a sequence length and a first selection reference value that is different from a second selection reference value (u+1)/31 used in a 3GPP release 10 or earlier, the first selection reference value being obtained from a sequence group number u assigned to the terminal according to a cell ID that is different from the first and second selection reference values, the determined reference signal sequence number being a sequence number q that makes an absolute value of a difference between the first selection reference value and q/N one of two lowest absolute values, where N is the sequence length;

generating a reference signal based on the determined reference signal sequence number; and transmitting the generated reference signal, wherein the first selection reference value is a ratio between a value based on the sequence group number and a minimum sequence length, the minimum sequence length being a maximum prime numerical value that does not exceed a number of subcarriers included in a minimum transmission bandwidth of transmission bandwidths available in the sequence group number.

9. The method according to claim 8, wherein the first selection reference value is a ratio between a value based on the sequence group number and a minimum sequence length of sequence lengths available in the sequence group number.

10. The method according to claim 8, wherein the second selection reference value is one of a plurality of second selection reference values, and a difference between the first selection reference value and a second selection reference value that is closest to the first selection reference value is different from a difference between the closest two second selection reference values of the plurality of second selection reference values.

11. The method according to claim 8, wherein the second selection reference value is one of a plurality of second selection reference values, and a difference between the first selection reference value and a second selection reference value that is closest to the first selection reference value is smaller than a difference between the two closest second selection reference values of the plurality of second selection reference values.

12. The method according to claim 8, wherein the second selection reference value is one of a plurality of second selection reference values, and the first selection reference value is numerically between the closest two second selection reference values of the plurality of second selection reference values.

13. The method according to claim 8, wherein the reference signal sequence number is a sequence number of a Zadoff-Chu sequence.

14. The method according to claim 8, wherein the first selection reference value is a ratio between u+1 and a minimum sequence length of sequence lengths available in the sequence group number.

* * * * *